United States Patent
Kim et al.

(10) Patent No.: US 12,384,860 B2
(45) Date of Patent: Aug. 12, 2025

(54) HYBRID SUPPORTED METALLOCENE CATALYST AND PROCESS FOR PREPARING POLYETHYLENE COPOLYMER USING THE SAME

(71) Applicant: LG Chem, Ltd., Seoul (KR)

(72) Inventors: Poeun Kim, Daejeon (KR); Seungmi Lee, Daejeon (KR); Hyun Jee Kwon, Daejeon (KR); Ki Soo Lee, Daejeon (KR); Yongwoo Kwon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 920 days.

(21) Appl. No.: 17/606,634

(22) PCT Filed: Nov. 20, 2020

(86) PCT No.: PCT/KR2020/016422
§ 371 (c)(1),
(2) Date: Oct. 26, 2021

(87) PCT Pub. No.: WO2021/101292
PCT Pub. Date: May 27, 2021

(65) Prior Publication Data
US 2022/0242977 A1    Aug. 4, 2022

(30) Foreign Application Priority Data

Nov. 20, 2019 (KR) .......................... 10-2019-0149717
Nov. 19, 2020 (KR) .......................... 10-2020-0155726

(51) Int. Cl.
*C08F 4/6592* (2006.01)
*C08F 210/02* (2006.01)

(52) U.S. Cl.
CPC ........ *C08F 4/65927* (2013.01); *C08F 210/02* (2013.01)

(58) Field of Classification Search
CPC .............. C08F 4/65904; C08F 4/65925; C08F 4/65927; C08F 210/16; C08F 4/6592; C08L 23/0815; C08L 23/08
See application file for complete search history.

(56) References Cited

U.S. PATENT DOCUMENTS

| | | | |
|---|---|---|---|
| 6,642,339 B1 | 11/2003 | Chai et al. | |
| 2002/0182426 A1 | 12/2002 | Tanaka et al. | |
| 2005/0159300 A1 | 7/2005 | Jensen et al. | |
| 2006/0235171 A1 | 10/2006 | Lee et al. | |
| 2011/0201770 A1 | 8/2011 | Yang et al. | |
| 2017/0081437 A1 | 3/2017 | Lernoux et al. | |
| 2018/0016372 A1 | 1/2018 | Kwon et al. | |
| 2019/0062474 A1 | 2/2019 | Kim et al. | |

(Continued)

FOREIGN PATENT DOCUMENTS

| | | |
|---|---|---|
| CN | 108026219 A | 5/2018 |
| EP | 0641809 A1 | 3/1995 |

(Continued)

OTHER PUBLICATIONS

Search Report dated Sep. 15, 2022 from the Office Action for Chinese Application No. 202080023435.1 issued Sep. 22, 2022, 3 pages.

(Continued)

*Primary Examiner* — Catherine S Branch
(74) *Attorney, Agent, or Firm* — Lerner David LLP

(57) ABSTRACT

The present disclosure provides a hybrid supported metallocene catalyst useful for preparing a polyethylene copolymer exhibiting excellent process stability and high polymerization activity in ethylene polymerization, and excellent mechanical properties by high comonomer incorporation. The hybrid supported metallocene catalyst comprises at least one first metallocene compound selected from compounds represented by the following Chemical Formula 1; and at least one second metallocene compound selected from compounds represented by the following Chemical Formula 2:

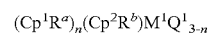

[Chemical Formula 1]

[Chemical Formula 2]

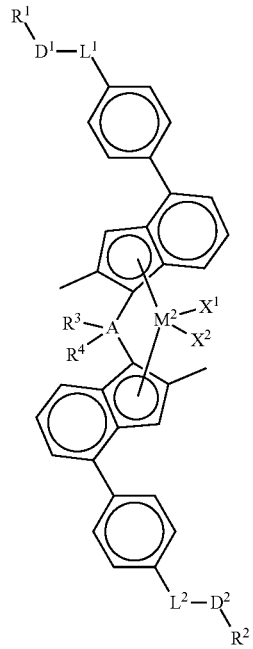

wherein all the variables are described herein.

14 Claims, No Drawings

(56) References Cited

U.S. PATENT DOCUMENTS

2019/0085100 A1 3/2019 Song et al.
2019/0106516 A1 4/2019 Park et al.

FOREIGN PATENT DOCUMENTS

| EP | 3421506 A1 | 1/2019 |
| EP | 3640269 A1 | 4/2020 |
| JP | H08238729 A | 9/1996 |
| KR | 20120076156 A | 7/2012 |
| KR | 20170075224 A | 7/2017 |
| KR | 20170099691 A | 9/2017 |
| KR | 20170105407 A | 9/2017 |
| KR | 20180057469 A | 5/2018 |
| KR | 20180071160 A | 6/2018 |
| KR | 20190060317 A | 6/2019 |
| KR | 20190074798 A | 6/2019 |
| KR | 20190074963 A | 6/2019 |
| WO | 9426816 A1 | 11/1994 |

OTHER PUBLICATIONS

International Search Report for PCT/KR2020/016422 dated Feb. 26, 2021, 3 pgs.
Alexakis, A., et al., "Mild Protection and Deprotection of Alcohols as Ter-Butyl Ethers in the Field of Pheromone Synthesis", "Tetrahedron Letters", 1988, pp. 2951-2954, vol. 29, No. 24, Laboratoire de Chimie des Organo-elements, tour 45, Paris, France.

HYBRID SUPPORTED METALLOCENE CATALYST AND PROCESS FOR PREPARING POLYETHYLENE COPOLYMER USING THE SAME

CROSS-REFERENCE TO RELATED APPLICATION(S)

The present application is a national stage entry under 35 U.S.C. § 371 of International Application No. PCT/KR2020/016422 filed on Nov. 20, 2020, which claims priority from Korean Patent Application No. No. 10-2019-0149717 filed on Nov. 20, 2019, and Korean Patent Application No. 10-2020-0155726 filed on Nov. 19, 2020, the disclosure of all of which are incorporated herein by reference.

TECHNICAL FIELD

The present disclosure relates to a hybrid supported metallocene catalyst, and a process for preparing a polyethylene copolymer using the same.

BACKGROUND

Olefin polymerization catalyst systems may be divided into Ziegler-Natta and metallocene catalysts, and these highly active catalyst systems have been developed in accordance with their characteristics.

Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single active site catalyst which is a homogeneous complex catalyst, and offers a polymer having a narrow molecular weight distribution and a uniform compositional distribution of comonomers, due to the single active site characteristics. The stereoregularity, copolymerization characteristics, molecular weight, crystallinity, etc. of the resulting polymer may be controlled by changing a ligand structure of the catalyst and polymerization conditions.

Recently, due to changes in environmental awareness, it has been attempted to reduce the generation of volatile organic compounds (VOCs) in many products. However, the Ziegler-Natta catalyst (Z/N), which is mainly used in the preparation of polyethylene, has a problem of generating many VOCs. In particular, various commercially available polyethylene products are mainly prepared using the Ziegler-Natta catalyst, but recently, a conversion to products prepared using the metallocene catalyst having low odor and low elution characteristics has been accelerated.

Meanwhile, linear low density polyethylene (LLDPE) is produced by copolymerizing ethylene and alpha-olefin using a polymerization catalyst under low pressure. However, there is a problem in that it is difficult to increase the impact strength of the film because of the low comonomer concentration in the high molecular weight parts of the polyethylene, due to the low comonomer incorporation characteristics of the conventional catalyst itself. In particular, when the concentration of a comonomer such as alpha-olefin is increased in the copolymerization process, there is a problem in that the morphology of the polymer produced is deteriorated. In addition, the lower the density of LLDPE, the higher the impact strength of the film, but the frequent occurrence of fouling during low-density polyethylene production deteriorates process stability.

Accordingly, there is a need for a catalyst for preparing low density polyethylene capable of producing a low density polyethylene resin product with excellent morphology and excellent dart drop impact strength while having excellent comonomer incorporation properties with a stable process during polyethylene production.

DETAILED DESCRIPTION OF THE INVENTION

Technical Problem

In the present disclosure, there is provided a hybrid supported metallocene catalyst useful for preparing a polyethylene copolymer with excellent mechanical properties due to excellent comonomer incorporation properties while maintaining high catalytic activities with a stable process in the ethylene polymerization.

In addition, there is provided a process for preparing a polyethylene copolymer using the hybrid supported metallocene catalyst.

Technical Solution

In the present disclosure, there is provided a hybrid supported metallocene catalyst including at least one first metallocene compound selected from compounds represented by the following Chemical Formula 1; at least one second metallocene compound selected from compounds represented by the following Chemical Formula 2; and a support on which the first and the second metallocene compounds are supported:

$$(Cp^1R^a)_n(Cp^2R^b)M^1Q^1_{3-n} \qquad \text{[Chemical Formula 1]}$$

in Chemical Formula 1, $M^1$ is a Group 4 transition metal;

$Cp^1$ and $Cp^2$ are same as or different from each other, and are each independently any one selected from the group consisting of cyclopentadienyl, indenyl, 4,5,6,7-tetrahydro-1-indenyl, and fluorenyl, each of which is unsubstituted or substituted with $C_{1-20}$ hydrocarbonyl;

$R^a$ and $R^b$ are same as or different from each other, and are each independently hydrogen, $C_{1-20}$alkyl, $C_{1-20}$alkoxy, $C_{2-20}$alkoxyalkyl, $C_{6-20}$ aryl, $C_{6-20}$ aryloxy, $C_{2-20}$alkenyl, $C_{7-40}$alkylaryl, $C_{7-40}$ arylalkyl, $C_{8-40}$ arylalkenyl, or $C_{2-10}$alkynyl, provided that at least one of $R^a$ or $R^b$ is not hydrogen;

each of $Q^1$ is independently halogen, $C_{1-20}$alkyl, $C_{2-20}$alkenyl, $C_{7-40}$alkylaryl, $C_{7-40}$ arylalkyl, $C_{6-20}$ aryl, substituted or unsubstituted $C_{1-20}$alkylidene, substituted or unsubstituted amino group, $C_{2-20}$alkoxyalkyl, $C_{2-20}$alkylalkoxy, or $C_{7-40}$ arylalkoxy; and n is 1 or 0;

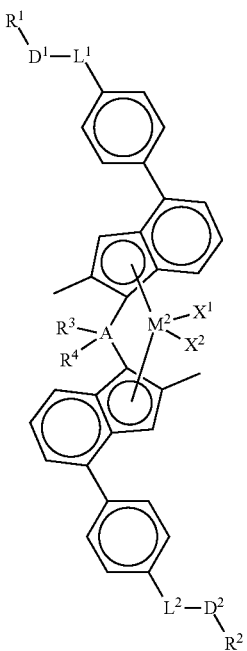

[Chemical Formula 2]

in Chemical Formula 2, $M^2$ is a Group 4 transition metal;

A is carbon (C), silicon (Si), or germanium (Ge);

$X^1$ and $X^2$ are the same as or different from each other, and are each independently halogen, or $C_{1-20}$ alkyl;

$L^1$ and $L^2$ are the same as or different from each other, and are each independently $C_{1-20}$ alkylidene;

$D^1$ and $D^2$ are oxygen;

$R^1$ and $R^2$ are same as or different from each other, and are each independently $C_{1-20}$ alkyl, $C_{2-20}$ alkenyl, $C_{6-20}$ aryl, $C_{7-40}$ alkylaryl, or $C_{7-40}$ arylalkyl;

$R^3$ and $R^4$ are same as or different from each other, and are each independently $C_{1-20}$ alkyl.

In the present disclosure, there is also provided a process for preparing a polyethylene copolymer, including the step of copolymerizing ethylene and alpha-olefin in the presence of the above-described hybrid supported metallocene catalyst.

In the present disclosure, there is also provided a polyethylene copolymer obtained by the above-described process.

The terminology used herein is for the purpose of describing particular embodiments only and is not intended to be limiting of the invention.

The singular forms are intended to include the plural forms as well, unless the context clearly indicates otherwise.

In the present disclosure, the terms "include", "comprise", or "have" specify the presence of stated features, numbers, steps, components, or combinations thereof, but do not preclude the presence or addition of one or more other features, numbers, steps, components, or combinations thereof.

The terms "about" or "substantially" used throughout the specification is intended to have meanings close to numerical values or ranges specified with an allowable error and intended to prevent accurate or absolute numerical values disclosed for understanding of the present invention from being illegally or unfairly used by any unconscionable third party.

Unless otherwise specified herein, "copolymerization" means block copolymerization, random copolymerization, graft copolymerization or alternating copolymerization, and "copolymer" means block copolymer, random copolymer, graft copolymer or alternating copolymer.

Also, as used herein, when a layer or an element is mentioned to be formed "on" other layers or elements, the layer or element may be directly formed on the other layers or elements, or additional layers or elements may be additionally formed between the layers, on a subject, or on a substrate.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present invention will be described in detail.

According to an embodiment of the present disclosure, there is provided a hybrid supported metallocene catalyst including at least one first metallocene compound selected from compounds represented by the following Chemical Formula 1; at least one second metallocene compound selected from compounds represented by the following Chemical Formula 2; and a support on which the first and the second metallocene compounds are supported:

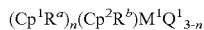

[Chemical Formula 1]

in Chemical Formula 1, $M^1$ is a Group 4 transition metal;

$Cp^1$ and $Cp^2$ are same as or different from each other, and are each independently any one selected from the group consisting of cyclopentadienyl, indenyl, 4,5,6,7-tetrahydro-1-indenyl, and fluorenyl, each of which is unsubstituted or substituted with $C_{1-20}$ hydrocarbonyl;

$R^a$ and $R^b$ are same as or different from each other, and are each independently hydrogen, $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl, provided that at least one of $R^a$ or $R^b$ is not hydrogen;

each of $Q^1$ is independently halogen, $C_{1-20}$ alkyl, $C_{2-20}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino group, $C_{2-20}$ alkoxyalkyl, $C_{2-20}$ alkylalkoxy, or $C_{7-40}$ arylalkoxy; and n is 1 or 0;

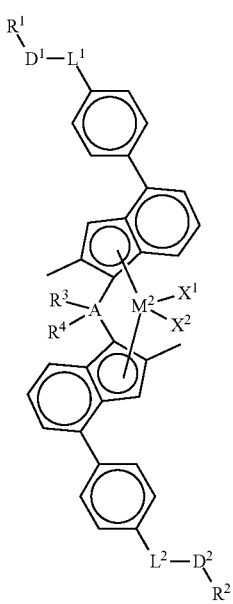

[Chemical Formula 2]

in Chemical Formula 2, $M^2$ is a Group 4 transition metal;

A is carbon (C), silicon (Si), or germanium (Ge);

$X^1$ and $X^2$ are the same as or different from each other, and are each independently halogen, or $C_{1-20}$ alkyl;

$L^1$ and $L^2$ are the same as or different from each other, and are each independently $C_{1-20}$ alkylidene;

$D^1$ and $D^2$ are oxygen;

$R^1$ and $R^2$ are same as or different from each other, and are each independently $C_{1-20}$ alkyl, $C_{2-20}$ alkenyl, $C_{6-20}$ aryl, $C_{7-40}$ alkylaryl, or $C_{7-40}$ arylalkyl;

$R^3$ and $R^4$ are same as or different from each other, and are each independently $C_{1-20}$ alkyl.

Unless otherwise specified herein, following terms may be defined as follows.

The hydrocarbyl group is a monovalent functional group in a hydrogen-removed form from a hydrocarbon, and may include an alkyl group, an alkenyl group, an alkynyl group, an aryl group, an aralkyl group, an aralkenyl group, an aralkynyl group, an alkylaryl group, an alkenylaryl group, an alkynylaryl group, and the like. The $C_{1-30}$ hydrocarbyl group may be a $C_{1-20}$ or $C_{1-10}$ hydrocarbyl group. For example, the hydrocarbyl group may be a linear, branched or cyclic alkyl. More specifically, the $C_{1-30}$ hydrocarbyl group may be a linear, branched or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group and a cyclohexyl group; or an aryl group such as phenyl, biphenyl, naphthyl, anthracenyl, phenanthrenyl, or fluorenyl. Moreover, it may be alkylaryl such as methylphenyl, ethylphenyl, methylbiphenyl, and methylnaphthyl, or arylalkyl such as phenylmethyl, phenylethyl, biphenylmethyl, and naphthylmethyl. It may also be alkenyl such as allyl, ethenyl, propenyl, butenyl, and pentenyl.

The hydrocarbyloxy group is a functional group in which the hydrocarbyl group is bonded to oxygen. Specifically, the $C_{1-30}$ hydrocarbyloxy group may be a $C_{1-20}$ or $C_{1-10}$ hydrocarbyloxy group. For example, the hydrocarbyloxy group may be a linear, branched or cyclic alkoxy. More specifically, the $C_{1-30}$ hydrocarbyloxy group may be a linear, branched or cyclic alkoxy group such as a methoxy group, an ethoxy group, an n-propoxy group, an iso-propoxy group, an n-butoxy group, an iso-butoxy group, a tert-butoxy group, an n-pentoxy group, an n-hexyloxy group, an n-heptoxy group and a cyclohexyloxy group; or an aryloxy group such as a phenoxy group and a naphthalenoxy group.

The hydrocarbyloxyhydrocarbyl group is a functional group in which at least one hydrogen of the hydrocarbyl group is substituted with at least one hydrocarbyloxy group. Specifically, the $C_{2-30}$ hydrocarbyloxyhydrocarbyl group may be a $C_{2-20}$ or $C_{2-15}$ hydrocarbyloxyhydrocarbyl group. For example, the hydrocarbyloxyhydrocarbyl group may be a linear, branched or cyclic alkoxyalkyl. More specifically, the $C_{2-30}$ hydrocarbyloxyhydrocarbyl group may be an alkoxyalkyl group such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group and a tert-butoxyhexyl group; or an aryloxyalkyl group such as a phenoxyhexyl group.

The hydrocarbyl(oxy)silyl group is a functional group in which one to three hydrogens of —$SiH_3$ are substituted with one to three hydrocarbyl or hydrocarbyloxy groups. Specifically, the $C_{1-30}$ hydrocarbyl(oxy)silyl group may be a $C_{1-20}$, $C_{1-15}$, $C_{1-10}$, or $C_{1-5}$ hydrocarbyl(oxy)silyl group. More specifically, the $C_{1-30}$ hydrocarbyl(oxy)silyl group may be an alkylsilyl group such as a methylsilyl group, a dimethylsilyl group, a trimethylsilyl group, a dimethylethylsilyl group, a diethylmethylsilyl group, or a dimethylpropylsilyl group; an alkoxysilyl group such as a methoxysilyl group, a dimethoxysilyl group, a trimethoxysilyl group, or a dimethoxyethoxysilyl group; or an alkoxyalkylsilyl group such as a methoxydimethylsilyl group, a diethoxymethylsilyl group, or a dimethoxypropylsilyl group.

The $C_{1-20}$ silylhydrocarbyl group is a functional group in which at least one hydrogen of the hydrocarbyl group is substituted with a silyl group. The silyl group may be —$SiH_3$ or a hydrocarbyl(oxy)silyl group. Specifically, the $C_{1-20}$ silylhydrocarbyl group may be a $C_{1-15}$ or $C_{1-10}$ silylhydrocarbyl group. More specifically, $C_{1-20}$ silylhydrocarbyl group may be a silylalkyl group such as —$CH_2$—$SiH_3$; an alkylsilylalkyl group such as a methylsilylmethyl group, a methylsilylethyl group, a dimethylsilylmethyl group, a trimethylsilylmethyl group, a dimethylethylsilylmethyl group, a diethylmethylsilylmethyl group, or a dimethylpropylsilylmethyl group; or an alkoxysilylalkyl group such as a dimethylethoxysilylpropyl group.

The halogen may be fluorine (F), chlorine (Cl), bromine (Br) or iodine (I).

The $C_{1-20}$alkyl may be linear, branched or cyclic alkyl. Specifically, the $C_{1-20}$ alkyl may be $C_{1-20}$ linear alkyl; $C_{1-15}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, the $C_{1-20}$ alkyl may be methyl, ethyl, propyl, isopropyl, n-butyl, tert-butyl, pentyl, hexyl, heptyl, octyl, cyclopropyl, cyclobutyl, cyclopentyl, cyclohexyl, cycloheptyl, cyclooctyl, or the like, but is not limited thereto.

The $C_{2-20}$ alkenyl may be linear, branched, or cyclic alkenyl. Specifically, it may be allyl, ethenyl, propenyl, butenyl, pentenyl, or the like, but is not limited thereto.

The $C_{1-20}$ alkoxy may be methoxy, ethoxy, isopropoxy, n-butoxy, tert-butoxy, pentoxy, cyclohexyloxy, or the like, but is not limited thereto.

The $C_{2-20}$ alkoxyalkyl group is a functional group in which at least one hydrogen of the above-mentioned alkyl is substituted with alkoxy, and it may be alkoxyalkyl such as methoxymethyl, methoxyethyl, ethoxymethyl, iso-propoxymethyl, iso-propoxyethyl, iso-propoxypropyl, iso-propoxyhexyl, tert-butoxymethyl, tert-butoxyethyl, tert-butoxypropyl, and tert-butoxyhexyl or the like, but is not limited thereto.

The $C_{6-20}$ aryloxy may be phenoxy, biphenoxy, naphthoxy, or the like, but is not limited thereto.

The $C_{7-40}$ aryloxyalkyl is a functional group in which at least one hydrogen of the above-mentioned alkyl is substituted with aryloxy, and it may be aryloxyalkyl such as phenoxymethyl, phenoxyethyl, phenoxyhexyl, or the like, but is not limited thereto.

The $C_{1-20}$ alkylsilyl or the $C_{1-20}$ alkoxysilyl is a functional group in which 1 to 3 hydrogens of —SiH$_3$ are substituted with 1 to 3 alkyl groups or alkoxy groups described above, and it may be alkylsilyl such as methylsilyl, dimethylsilyl, trimethylsilyl, dimethylethylsilyl, diethylmethylsilyl or dimethylpropylsilyl; alkoxysilyl such as methoxysilyl, dimethoxysilyl, trimethoxysilyl or dimethoxyethoxysilyl; or alkoxyalkylsilyl such as methoxydimethylsilyl, diethoxymethylsilyl or dimethoxypropylsilyl; or the like, but is not limited thereto.

The $C_{1-20}$ silylalkyl is a functional group in which at least one hydrogen of the above-mentioned alkyl is substituted with silyl, and it may be —CH$_2$—SiH$_3$, methylsilylmethyl or dimethylethoxysilylpropyl, or the like, but is not limited thereto.

In addition, the $C_{1-20}$ alkylene or alkylidene is the same as the above-mentioned alkyl except that it is a divalent substituent, and it may be methylene, ethylene, propylene, butylene, pentylene, hexylene, heptylene, octylene, cyclopropylene, cyclobutylene, cyclopentylene, cyclohexylene, cycloheptylene, cyclooctylene, or the like, but is not limited thereto.

The $C_{6-20}$ aryl may be a monocyclic, bicyclic or tricyclic aromatic hydrocarbyl. For example, the $C_{6-20}$ aryl may be phenyl, biphenyl, naphthyl, anthracenyl, phenanthrenyl, fluorenyl, or the like, but is not limited thereto.

The $C_{7-20}$ alkylaryl may refer to a substituent in which at least one hydrogen of the aromatic ring is substituted with the above-mentioned alkyl. For example, the $C_{7-20}$ alkylaryl may be methylphenyl, ethylphenyl, methylbiphenyl, methylnaphthyl, or the like, but is not limited thereto.

The $C_{7-20}$ arylalkyl may refer to a substituent in which at least one hydrogen of the alkyl is substituted with the above-mentioned aryl. For example, the $C_{7-20}$ arylalkyl may be phenylmethyl, phenylethyl, biphenylmethyl, naphthylmethyl, or the like, but is not limited thereto.

In addition, the $C_{6-20}$ arylene or arylidene is the same as the above-mentioned aryl except that it is a divalent substituent, and it may be phenylene, biphenylene, naphthylene, anthracenylene, phenanthrenylene, fluorenylene, or the like, but is not limited thereto.

The Group 4 transition metal may be titanium (Ti), zirconium (Zr), hafnium (Hf), or rutherfordium (Rf), and may specifically be titanium (Ti), zirconium (Zr), or hafnium (Hf). More specifically, it may be zirconium (Zr), or hafnium (Hf), but the present disclosure is not limited thereto.

Further, the Group 13 element may be boron (B), aluminum (Al), gallium (Ga), indium (In), or thallium (Tl), and may specifically be boron (B) or aluminum (Al), but the present disclosure is not limited thereto.

The above-mentioned substituents may be optionally substituted with one or more substituents selected from the group consisting of a hydroxyl group; a halogen; an alkyl or alkenyl, aryl, alkoxy group; an alkyl or alkenyl, aryl, alkoxy group containing at least one heteroatom of Group 14 to 16 heteroatoms; a silyl group; an alkylsilyl or alkoxysilyl group; a phosphine group; a phosphide group; a sulfonate group; and a sulfone group.

Meanwhile, the hybrid supported metallocene catalyst of the present disclosure is prepared by hybrid supporting a first metallocene compound capable of reinforcing a low-copolymerization and a second metallocene compound capable of increasing high molecular weight characteristics during ethylene polymerization, thereby exhibiting excellent process stability and high activity for ethylene polymerization. In addition, it is useful for preparing a polyethylene copolymer having excellent mechanical properties by improving the copolymerization (comonomer incorporation) of the ethylene.

In particular, in the hybrid supported metallocene catalyst according to the embodiment, the first metallocene compound represented by the Chemical Formula 1 contributes to producing a low molecular weight linear copolymer, and the second metallocene compound represented by the Chemical Formula 2 contributes to producing a high molecular weight linear copolymer. The hybrid supported metallocene catalyst may exhibit excellent supporting performance, catalytic activity, and high comonomer incorporation by using the first metallocene compound having low comonomer incorporation and the second metallocene compound having high comonomer incorporation as the hybrid catalyst. Particularly, when low density polyethylene is produced in a slurry process in the presence of the hybrid supported metallocene catalyst, stability is improved in the process, and thus fouling problems that have occurred in the prior art can be prevented. In addition, polyethylene having excellent physical properties, for example, low density polyethylene, may be provided by using the hybrid supported metallocene catalyst.

Specifically, the first metallocene compound is characterized by having a form that cyclopentadienyl, indenyl, or fluorenyl ligands are bridged with a Group 4 transition metal, and these ligands are at least one of the substituents other than hydrogen In Chemical Formula 1. For example, a cyclopentadienyl, indenyl, or fluorenyl ligand may be unsubstituted or substituted with a $C_{1-20}$ hydrocarbyl or a $C_{1-12}$ hydrocarbyl. In particular, the cyclopentadienyl, indenyl, or fluorenyl ligand is substituted with at least one alkyl or alkenyl, alkoxyalkyl, arylalkyl or the like. Then, catalytic activity and copolymerizability can be improved, the resulting polymer molecular structure can be improved, and the reactivity control can be excellent by applying the cyclopentadienyl, indenyl, or fluorenyl ligand having the above specific structures.

In Chemical Formula 1, $M^1$ may be zirconium (Zr) or hafnium (Hf), and preferably be zirconium (Zr).

And, in Chemical Formula 1, each of $Cp^1$ and $Cp^2$ may be independently cyclopentadienyl, indenyl, or fluorenyl. Preferably, at least one of $Cp^1$ or $Cp^2$ is cyclopentadienyl or indenyl. More preferably, both $Cp^1$ and $Cp^2$ may be cyclopentadienyl.

$Cp^1$ and $Cp^2$ may be independently unsubstituted or substituted with at least one $C_{1-20}$ hydrocarbyl. For example, $Cp^1$ and $Cp^2$ may be independently substituted with one or more of a $C_{1-10}$ hydrocarbyl group, a $C_{1-10}$ hydrocarbyloxy group, or a $C_{1-10}$ hydrocarbyloxyhydrocarbyl group. Specifically, $Cp^1$ and $Cp^2$ may be substituted with one or more of methyl, ethyl, n-propyl, n-butyl, tert-butyl, n-pentyl, n-hexyl, tert-butoxyhexyl, butenyl, phenylpropyl, phenylhexyl, or phenyl.

More specifically, in the first metallocene compound, $Cp^1$ and $Cp^2$ may be the same as or different from each other. Preferably, $Cp^1$ and $Cp^2$ may be the same as each other and include the same substituents to form a symmetrical structure.

In addition, each of $R^a$ and $R^b$ is independently hydrogen, $C_{1-6}$ linear or branched alkyl, $C_{2-6}$ alkynyl, $C_{1-6}$ alkoxy-substituted $C_{1-6}$ alkyl, $C_{6-12}$ aryl-substituted $C_{1-6}$ alkyl, or $C_{6-12}$ aryl, provided that at least one of $R^a$ or $R^b$ is not hydrogen. In particular, $R^a$ and $R^b$ may be the same as or different from each other, for example, $R^a$ and $R^b$ may be the same as each other, and may have a symmetrical structure In Chemical Formula 1. For example, each of $R^a$ and $R^b$ may be hydrogen, methyl (Me), ethyl (Et), n-propyl (n-Pr), iso-propyl (i-Pr), n-butyl (n-Bu), tert-Butyl (t-Bu), n-pentyl (n-Pt), n-hexyl (n-Hex), tert-butoxy (t-Bu-O) hexyl, butenyl, phenylpropyl, phenylhexyl, or phenyl (Ph).

In Chemical Formula 1, each Q1 may be a halogen, for example, chlorine.

In Chemical Formula 1, n is 1 or 0, preferably n is 1.

Meanwhile, the first metallocene compound may be represented by any one of the following Chemical Formulae 1-1 to 1-5.

[Chemical Formula 1-1]

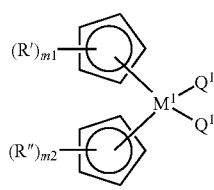

[Chemical Formula 1-2]

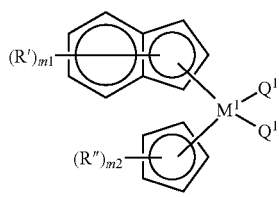

[Chemical Formula 1-3]

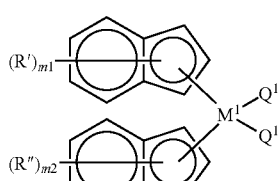

[Chemical Formula 1-4]

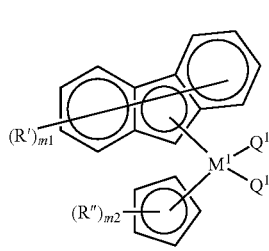

[Chemical Formula 1-5]

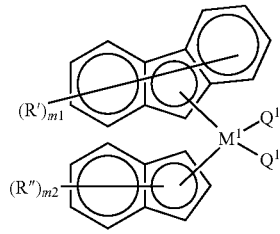

In Chemical Formulae 1-1 to 1-5, $M^1$ and $Q^1$ are the same as defined in Chemical Formula 1, R' and R" are the same as or different from each other, and each independently represents $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

m1 is each independently an integer of 0 to 8;

m2 is each independently an integer of 0-6, and at least one of m1 or m2 is not 0.

More preferably, the first metallocene compound may be represented by Formula 1-1.

In Chemical Formulae 1-1 to 1-5, R' and R" are each independently $C_{1-6}$ leaner or branched alkyl, $C_{2-6}$ alkynyl, $C_{1-6}$ alkoxy-substituted $C_{1-6}$ alkyl, $C_{6-12}$ aryl-substituted $C_{1-6}$ alkyl, or $C_{6-12}$ aryl. Preferably, at least one of R' or R" is methyl (Me), ethyl (Et), n-propyl (n-Pr), iso-propyl (i-Pr), n-butyl (n-Bu), tert-butyl (t-Bu), n-pentyl (n-Pt), n-hexyl (n-Hex), tert-butoxy (t-Bu-O) hexyl, butenyl, phenylpropyl, phenylhexyl, or phenyl (Ph).

Further, in Chemical Formulae 1-1 to 1-5, m1 and m2 are each independently an integer of 1 to 4, preferably 1 or 2, respectively.

In addition, the first metallocene compound may be represented by one of the following structural formulae.

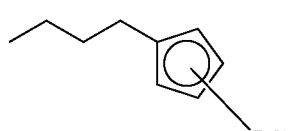

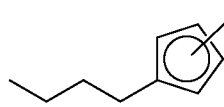

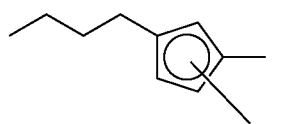

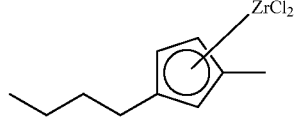

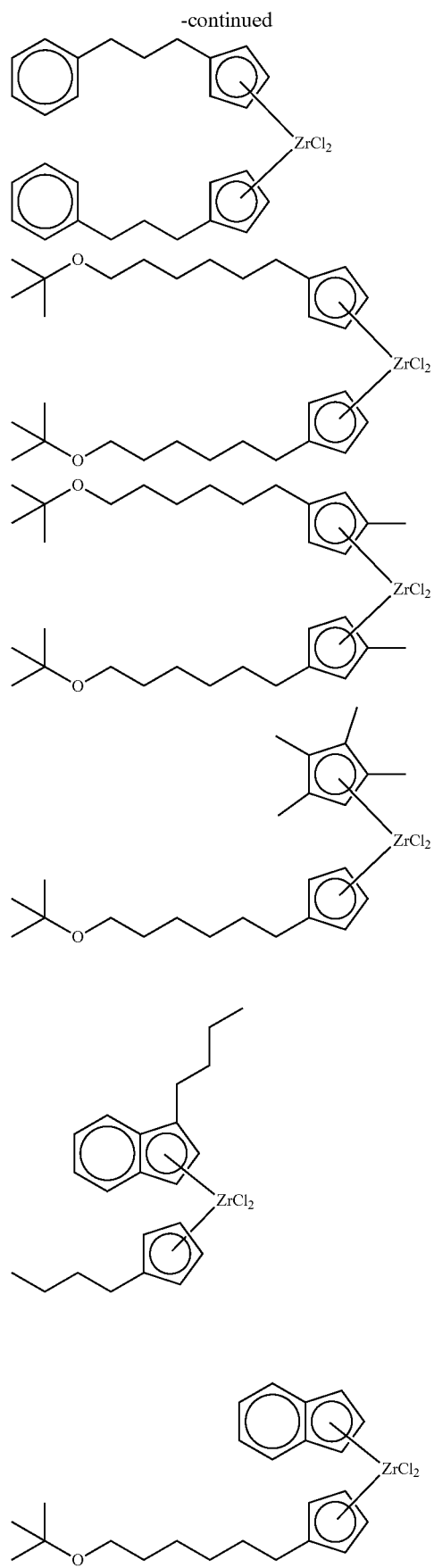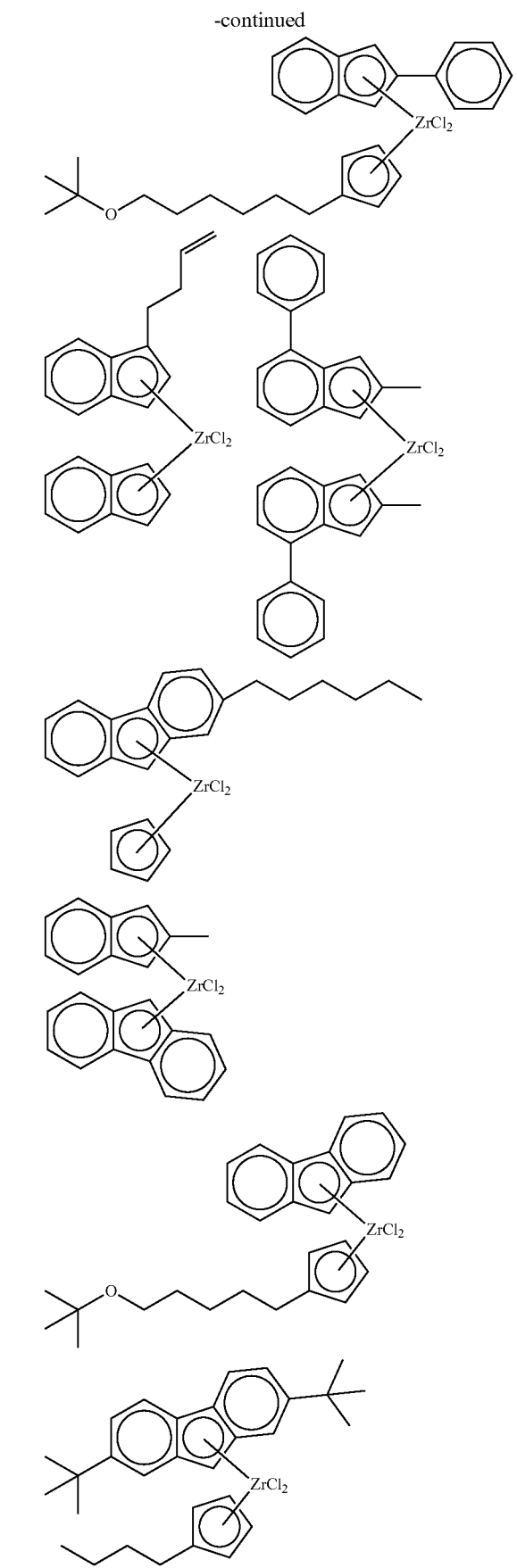

-continued

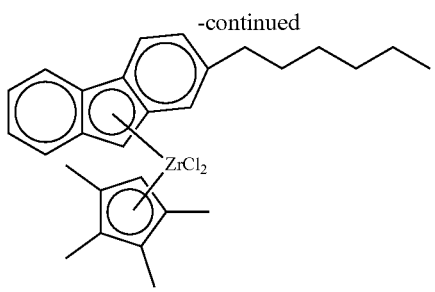

The first metallocene compound represented by the above structural formulae may be synthesized by applying known reactions, and a more detailed synthesis method may be understood with reference to Examples.

Meanwhile, the hybrid supported metallocene catalyst of the present disclosure is characterized in that it includes the second metallocene compound represented by Chemical Formula 2 together with the above-described first metallocene compound.

Specifically, the second metallocene compound is characterized by having a form that two indenyl ligands are bonded to each other through a Group 4 transition metal bridge and carbon or silicon bridge, and each of the hydrogens at 2-position and 4-position of the indenyl ligand is substituted with methy and aryl substituted with a hydrocarbyloxyhydrocarbyl group, respectively. In particular, it is characterized in that two indenyl ligands having the specific substituents as such is comprised in the same symmetric structure with each other. Then, process stability is increased by reducing the ratio of ethylene and comonomer in the reaction system with high copolymerizability, and high comonomer copolymerization (comonomer) in the polymer region of the resulting polyethylene molecular weight distribution graph Incorporation), by applying applying the bis-indenyl ligand of the specific structure and substituents. Accordingly, it is possible to produce linear low density polyethylene products with excellent morphology and high impact strength.

In Chemical Formula 2, $M^2$ may be zirconium (Zr) or hafnium (Hf), and preferably be zirconium (Zr).

And, in Chemical Formula 2, A may be silicon (Si).

In Chemical Formula 2, each of $X^1$ and $X^2$ may be halogen, and specifically be chlorine.

Further, in Chemical Formula 2, $L^1$ and $L^2$ may each be a $C_{1-3}$ alkylidene, and specifically may be methylidene, ethylidene, or propylidene.

In Chemical Formula 2, $D^1$ and $D^2$ are oxygen (O).

In Chemical Formula 2, each of $R^1$ and $R^2$ may be $C_{1-6}$ leaner or branched alkyl, or $C_{6-12}$ aryl. For example, $R^1$ and $R^2$ may be the same as each other, and may be each methyl (Me), ethyl (Et), n-propyl (n-Pr), iso-propyl (i-Pr), n-butyl (n-Bu), tert-butyl (t-Bu), or phenyl (Ph).

Also, in Chemical Formula 2, $R^3$ and $R^4$ may each independently be a linear or branched $C_{1-6}$ alkyl. Specifically, $R^3$ and $R^4$ may be the same as each other, and may be each a linear $C_{1-6}$ alkyl. For example, each of $R^3$ and $R^4$ may be methyl (Me), ethyl (Et), n-propyl (n-Pr), n-butyl (n-Bu), n-pentyl (n-Pt), or n-hexyl (n-Hex).

Meanwhile, the second metallocene compound may be represented by the following Chemical Formula 2-1.

[Chemical Formula 2-1]

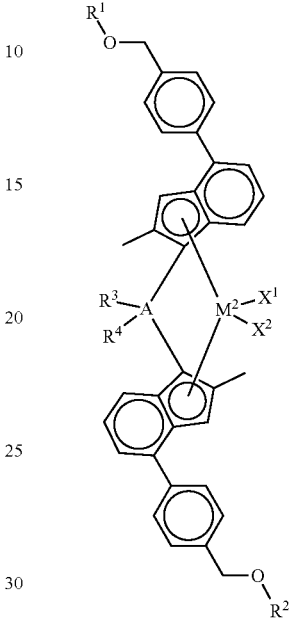

In Chemical Formula 2-1, $M^2$, A, $X^1$, $X^2$, $R^1$, $R^2$, $R^3$, and $R^4$ are the same as defined in Chemical Formula 2.

Specifically, the second metallocene compound may be represented by one of the following structural formulae.

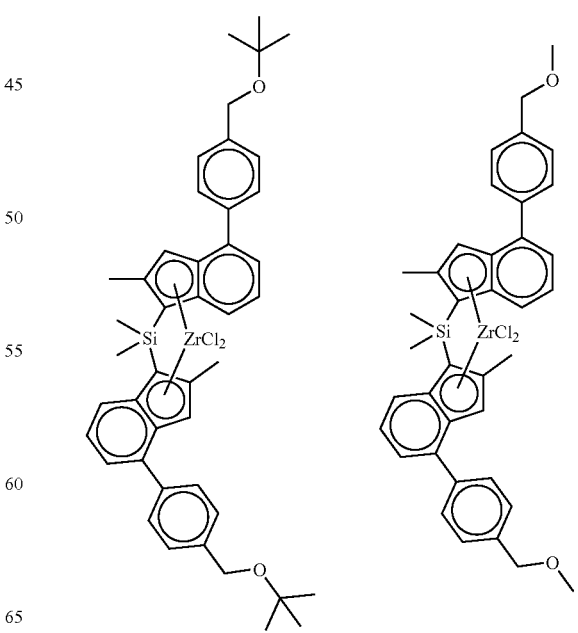

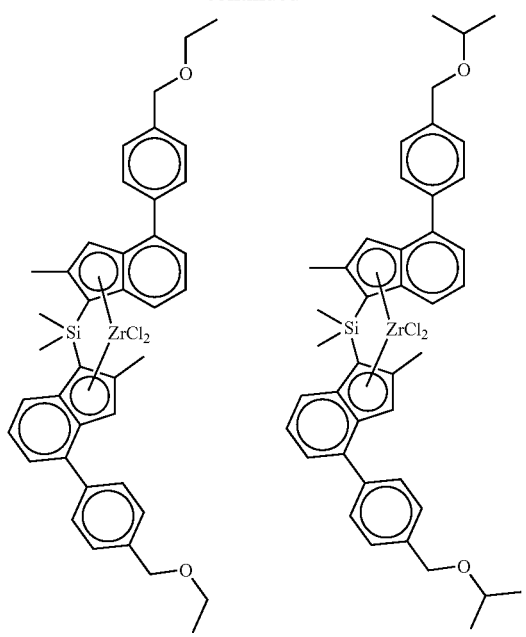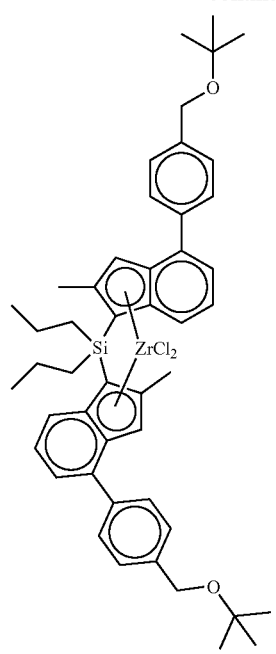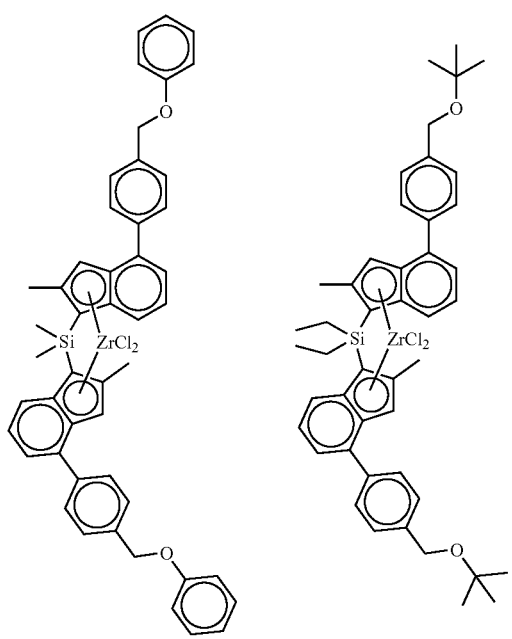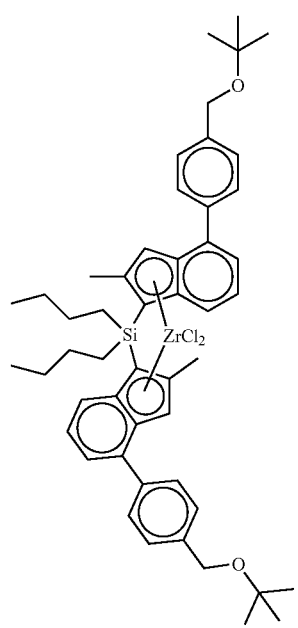

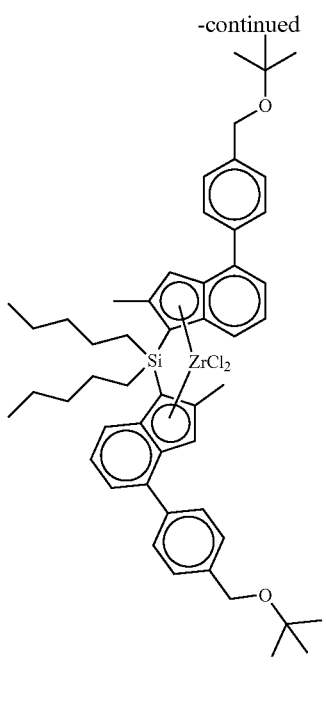

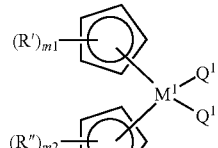

[Chemical Formula 1-1]

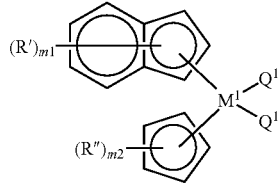

[Chemical Formula 1-2]

[Chemical Formula 1-3]

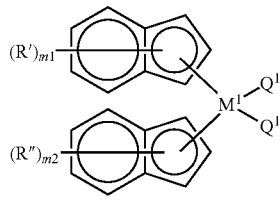

[Chemical Formula 1-4]

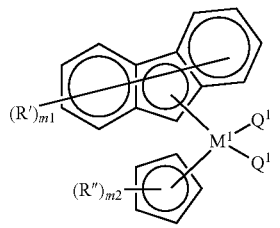

[Chemical Formula 1-5]

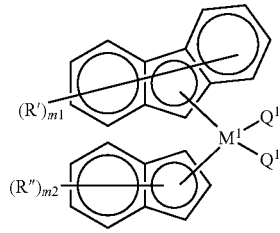

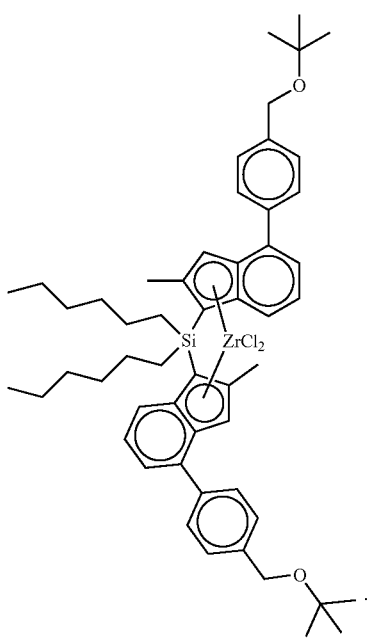

The second metallocene compound represented by the above structural formulae may be synthesized by applying known reactions, and a more detailed synthesis method may be understood with reference to Examples.

Meanwhile, in the process for preparing the metallocene compound, the hybrid supported catalyst, or the catalyst composition of the present disclosure, the equivalent weight (eq) refers to a molar equivalent weight (eq/mol).

In particular, in the hybrid supported metallocene catalyst of the present disclosure, the first metallocene compound may be represented by any one of the following Chemical Formulas 1-1 to 1-5, and the second metallocene compound may be represented by the following Chemical Formula 2-1:

In Chemical Formulae 1-1 to 1-5, $M^1$ and $Q^1$ are the same as defined in Chemical Formula 1, R' and R" are the same as or different from each other, and each independently represents $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

m1 is each independently an integer of 0 to 8;

m2 is each independently an integer of 0-6, and at least one of m1 or m2 is not

[Chemical Formula 2-1]

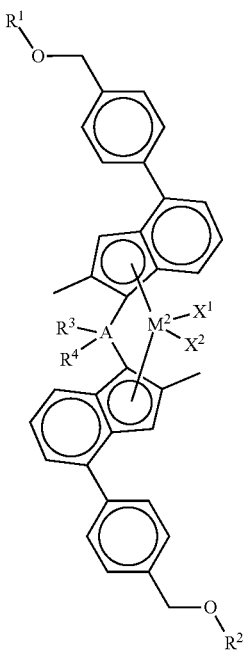

In Chemical Formula 2-1, $M^2$, A, $X^1$, $X^2$, $R^1$, $R^2$, $R^3$, and $R^4$ are the same as defined in Chemical Formula 2.

In addition, the hybrid supported metallocene catalyst of the present disclosure may be the specific structure and substituents. Specifically, in Chemical Formulae 1-1 to 1-5, $M^1$ is Zr; $Q^1$ is all Cl; and at least one of R' or R" is methyl (Me), ethyl (Et), n-propyl (n-Pr), iso-propyl (i-Pr), n-butyl (n-Bu), tert-butyl (t-Bu), n-pentyl (n-Pt), n-hexyl (n-Hex), tert-butoxy (t-Bu-O) hexyl, butenyl, phenylpropyl, phenylhexyl, or phenyl (Ph). Also, in Chemical Formula 2-1, $M^2$ is Zr; $X^1$ and $X^2$ are Cl; $R^1$ and $R^2$ are the same as each other, and methyl (Me), ethyl (Et), n-propyl (n-Pr), iso-propyl (i-Pr), n-butyl (n-Bu), tert-butyl (t-Bu), or phenyl (Ph); and $R^3$ and $R^4$ are the same as each other, and methyl (Me); ethyl (Et), n-propyl (n-Pr), n-butyl (n-Bu), n-pentyl (n-Pt), or n-hexyl (n-Hex).

In the present disclosure, the first metallocene compound and the second metallocene compound may be a meso isomer, a racemic isomer, or a mixture thereof.

In the present disclosure, "racemic form", "racemate" or "racemic isomer" refers to a form in which the same substituents on two cyclopentadienyl moieties are on opposite sides with respect to a plane containing a transition metal represented by $M^1$ or $M^2$ in Chemical Formula 1 or 2 such as zirconium (Zr) or hafnium (Hf), and a center of the cyclopentadienyl moieties.

In addition, "meso form" or "meso isomer" refers to a stereoisomer of the above-mentioned racemic isomer, wherein the same substituents on two cyclopentadienyl moieties are on the same side with respect to a plane containing a transition metal represented by $M^1$ or $M^2$ in Chemical Formula 1 or 2 such as zirconium (Zr) or hafnium (Hf), and a center of the cyclopentadienyl moieties.

Meanwhile, in the hybrid supported metallocene catalyst of the present disclosure, the first metallocene compound and the second metallocene compound may be supported in a molar ratio of about 0.3:1 to about 4:1. When including the first and second metallocene compounds in the above-described molar ratio, excellent supporting performance, catalytic activity, and high comonomer incorporation may be exhibited. In particular, when low density polyethylene is produced in a slurry process in the presence of the hybrid supported metallocene catalyst, stability is improved in the process, and thus fouling problems that have occurred in the prior art can be prevented. For example, when the supporting ratio of the first metallocene compound and the second metallocene compound exceeds about 4:1, only the first metallocene compound plays a dominant role and the copolymerizability is lowered, so that the production of low density polyethylene could be difficult. In addition, when the supporting ratio is less than about 0.3:1, only the second metallocene compound plays a dominant role, and it may be difficult to obtain the desired molecular structure of the resultant polymer.

Specifically, the hybrid supported metallocene catalyst in which the first metallocene compound and the second metallocene compound are supported in a molar ratio of about 0.5:1 to about 4:1, or about 1:1 to about 4:1, or about 1:1 to about 2:1 exhibits high activity in ethylene polymerization and high comonomer incorporation, and is preferably used for preparing polyethylene having excellent mechanical properties.

That is, the hybrid supported metallocene catalyst of the present disclosure in which the first metallocene compound and the second metallocene compound are supported within the above molar ratio may further improve both the physical properties of polyethylene and film thereof due to interaction between the two or more catalysts.

In the hybrid supported metallocene catalyst of the present disclosure, a support containing hydroxyl groups on its surface may be used as the support for supporting the first metallocene compound and the second metallocene compound. Preferably, a support containing highly reactive hydroxyl groups and siloxane groups, which has already been dried to remove moisture on the surface, may be used.

For example, the support may be at least one selected from the group consisting of silica, silica-alumina, or silica-magnesia dried at a high temperature, and commonly contain oxide, carbonate, sulfate, and nitrate such as $Na_2O$, $K_2CO_3$, $BaSO_4$, $Mg(NO_3)_2$, and the like.

A drying temperature of the support may preferably be about 200 to 800° C., more preferably about 300 to 600° C., and most preferably about 300 to 400° C. When the drying temperature of the support is less than 200° C., surface moisture may react with the cocatalyst to be described later due to excessive moisture. When it is greater than 800° C., pores on the surface of the support may be combined to reduce the surface area, and a lot of hydroxyl groups may be lost on the surface and only siloxane groups may remain, thus decreasing the reaction sites with the cocatalyst, which is not preferable.

The amount of the hydroxyl groups on the surface of the support may preferably be about 0.1 to 10 mmol/g, more preferably about 0.5 to 5 mmol/g. The amount of the hydroxyl groups on the surface of the support may be controlled by the preparation method and conditions of the support, or drying conditions, for example, temperature, time, vacuum, spray drying, or the like.

When the amount of the hydroxyl groups is less than about 0.1 mmol/g, the reaction sites with the cocatalyst may be little, and when it is greater than about 10 mmol/g, there is a possibility of being derived from moisture other than hydroxyl groups on the surface of the support particle, which is not preferable.

For example, a total amount of the first and second metallocene compounds supported on a support such as silica, that is, a supported amount of the metallocene compounds may be 0.01 mmol/g to 1 mmol/g based on 1 g of the support. That is, it is preferable to control the amount within the above-described range in consideration of the effect that the metallocene compound contributes to the catalyst.

Meanwhile, the hybrid supported metallocene catalyst may be one in which at least one of the first metallocene compound and at least one of the second metallocene compound are supported on a support together with a cocatalyst compound. The cocatalyst may be any cocatalyst which is used for polymerization of olefins in the presence of a general metallocene catalyst. This cocatalyst enables bonding between the hydroxyl group and the Group 13 transition metal in the support. In addition, since the cocatalyst is present only on the surface of the support, it can contribute to achieving intrinsic properties of the specific hybrid catalyst composition of the present disclosure without a fouling phenomenon in which polymer particles are agglomerated to the reactor wall or with each other.

In addition, the hybrid supported metallocene catalyst of the present disclosure may further include at least one cocatalyst selected from the group consisting of compounds represented by the following Chemical Formulae 3 to 5.

$$—[Al(R^{31})—O]_c—$$ [Chemical Formula 3]

in Chemical Formula 3,
$R^{31}$ are each independently halogen, $C_{1-20}$ alkyl, or $C_{1-20}$ haloalkyl, and
c is an integer of 2 or more;

$$D(R^{41})_3$$ [Chemical Formula 4]

in Chemical Formula 4,
D is aluminum or boron, and
$R^{41}$ are each independently hydrogen, halogen, $C_{1-20}$ hydrocarbyl or $C_{1-20}$ hydrocarbyl substituted with halogen, $$[L-H]^+[Q(E)_4]^- \text{ or } [L]^+[Q(E)_4]^-$$ [Chemical Formula 5]

in Chemical Formula 5,
L is a neutral or cationic Lewis base;
$[L-H]^+$ is a bronsted acid,
Q is $B^{3+}$ or $Al^{3+}$, and
E are each independently $C_{6-40}$ aryl or $C_{1-20}$ alkyl, provided that $C_{6-40}$ aryl or $C_{1-20}$ alkyl may be unsubstituted or substituted with at least one substituent selected from the group consisting of halogen, $C_{1-20}$ alkyl, $C_{1-20}$ alkoxy, or $C_{6-40}$ aryloxy.

The compound represented by Chemical Formula 3 may be alkylaluminoxane such as modified methyl aluminoxane (MMAO), methyl aluminoxane (MAO), ethylaluminoxane, isobutylaluminoxane, butylaluminoxane, and the like.

The alkyl metal compound represented by Chemical Formula 4 may be trimethylaluminum, triethylaluminum, triisobutylaluminum, tripropylaluminum, tributylaluminum, dimethylchloroaluminum, dimethylisobutylaluminum, diethylethylaluminum, diethylchloroaluminum, triisopropylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, or the like.

The compound represented by Chemical Formula 5 may be triethylammonium tetraphenylboron, tributylammonium tetraphenylboron, trimethylammonium tetraphenylboron, tripropylammonium tetraphenylboron, trimethylammonium tetra(p-tolyl)boron, tripropylammonium tetra(p-tolyl)boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-dimethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N,N-dimethylanilinium tetraphenylaluminum, N,N-diethylanilinium tetrapentafluorophenylaluminum, diethylammonium tetrapentafluorophenylaluminum, triphenylphosphonium tetraphenylaluminum, trimethylphosphonium tetraphenylaluminum, triphenylcarbonium tetraphenylboron, triphenylcarbonium tetraphenylaluminum, triphenylcarbonium tetra(p-trifluoromethylphenyl)boron, triphenylcarbonium tetrapentafluorophenylboron, or the like.

In addition, the hybrid supported metallocene catalyst may include the cocatalyst and the first metallocene compound in a molar ratio of about 1:1 to about 1:10000, preferably about 1:1 to about 1:1000, more preferably about 1:10 to about 1:100.

In addition, the hybrid supported metallocene catalyst may include the cocatalyst and the second metallocene compound in a molar ratio of about 1:1 to about 1:10000, preferably about 1:1 to about 1:1000, more preferably about 1:10 to about 1:100.

At this time, if the molar ratio is less than about 1, the metal content of the cocatalyst is too small, so catalytically active species are not well formed, resulting in low activity. If the molar ratio exceeds about 10000, the metal of the cocatalyst act as a catalyst poison.

The cocatalyst may be supported in an amount of about 5 mmol to about 20 mmol based on 1 g of the support.

Meanwhile, the hybrid supported metallocene catalyst may be prepared by a method including the steps of supporting a cocatalyst on a support; supporting a first metallocene compound on the support on which the cocatalyst is supported; and supporting a second metallocene compound on the support on which the cocatalyst and the first metallocene compound are supported.

Alternatively, the hybrid supported metallocene catalyst may be prepared by a method including the steps of supporting a cocatalyst on a support; supporting a second metallocene compound on the support on which the cocatalyst is supported; and supporting a first metallocene compound on the support on which the cocatalyst and the second metallocene compound are supported.

Alternatively, the hybrid supported metallocene catalyst may be prepared by a method including the steps of supporting a first metallocene compound on a support; supporting a cocatalyst on the support on which the first metallocene compound is supported; and supporting a second metallocene compound on the support on which the cocatalyst and the first metallocene compound are supported.

In the above method, the supporting conditions are not particularly limited and the supporting step may be carried out within a range well known to those skilled in the art. For example, the supporting step may be carried out at a high temperature and at a low temperature appropriately. For example, the supporting temperature may be in a range of about −30° C. to about 150° C., preferably in a range of about 50° C. to about 98° C., or about 55° C. to about 95° C. The supporting time may be appropriately controlled depending on the amount of the first metallocene compound to be supported. The reacted supported catalyst may be used without further treatment after the reaction solvent is removed through filtration or distillation under reduced pressure, or subjected to Soxhlet filtering using aromatic hydrocarbon such as toluene, if necessary.

The preparation of the supported catalyst may be carried out in the presence of a solvent or without a solvent. When the solvent is used, it may include aliphatic hydrocarbon solvents such as hexane or pentane, aromatic hydrocarbon solvents such as toluene or benzene, chlorinated hydrocarbon solvents such as dichloromethane, ether solvents such as diethylether or tetrahydrofuran (THF), and common organic solvents such as acetone or ethylacetate. It is preferable to use hexane, heptane, toluene, or dichloromethane.

Meanwhile, there is provided a process for preparing a polyethylene copolymer, including the step of copolymerizing ethylene and alpha-olefin in the presence of the above hybrid supported metallocene catalyst.

The above-described hybrid supported metallocene catalyst may exhibit excellent supporting performance, catalytic activity, and high comonomer incorporation. Thus, even when low density polyethylene is produced in a slurry process in the presence of the hybrid supported metallocene catalyst, conventional problems of poor productivity and fouling can be prevented and process stability can be improved.

The process for preparing the polyethylene copolymer may be performed by slurry polymerization with a conventional apparatus and contacting technique using ethylene and alpha-olefin as raw materials in the presence of the above-described hybrid supported metallocene catalyst.

The process for preparing the polyethylene copolymer may be performed by copolymerizing ethylene and alpha-olefin using a continuous slurry polymerization reactor, a loop slurry reactor, or the like, but is not limited thereto.

Specifically, the copolymerization reaction may be carried out by reacting the alpha-olefin in an amount of about 0.45 moles or less or about 0.1 to about 0.45 moles based on 1 mole of ethylene. More specifically, the alpha-olefin is about 0.4 moles or less, or about 0.38 moles or less, or about 0.35 moles or less, or about 0.31 moles or less, and about 0.15 moles or more, or about 0.2 moles or more, or about 0.25 moles or more, or about 0.28 moles or more, based on 1 mole of ethylene.

In the method for producing the polyethylene copolymer of the present disclosures, it is not necessary to increase the comonomer content in order to lower the product density, so the process can be stable and the high dart drop impact strength of the product can be obtained In addition, the alpha-olefin may be at least one selected from the group consisting of 1-butene, 1-pentene, 1-hexene, 4-methyl-1-pentene, 1-octene, 1-decene, 1-dodecene, 1-tetradecene, 1-hexadecene, 1-octadecene, 1-eicosene, and a mixture thereof. Preferably, the alpha-olefin may be 1-hexene.

Specifically, in the process for preparing the polyethylene copolymer, for example, 1-hexene may be used as the alpha-olefin. Accordingly, in the slurry polymerization, a low density polyethylene copolymer may be prepared by polymerizing ethylene and 1-hexene.

In addition, the polymerization may be performed at a temperature of about 25° C. to about 500° C., about 25° C. to about 300° C., about 30° C. to about 200° C., about 50° C. to about 150° C., or about 60° C. to about 120° C. In addition, the polymerization may be performed at a pressure of about 1 bar to about 100 bar, or about 5 bar to about 90 bar, or about 10 bar to about 80 bar, or about 15 bar to about 70 bar, or about 20 bar to about 60 bar.

In addition, the supported metallocene catalyst may be dissolved or diluted in a $C_{5-12}$ aliphatic hydrocarbon solvent such as pentane, hexane, heptane, nonane, decane and an isomer thereof, in an aromatic hydrocarbon solvent such as toluene and benzene, or in a hydrocarbon solvent substituted with chlorine such as dichloromethane and chlorobenzene, and injected. The solvent used herein is preferably used after removing a small amount of water or air, which acts as a catalyst poison, by treating with a small amount of alkyl aluminum. It is also possible to further use the cocatalyst.

For example, the polymerization reaction may be carried out under the presence of the hydrogen gas in about 800 ppm or less, or about 0 to about 800 ppm, or about 300 ppm or less, or about 10 ppm to about 300 ppm, or about 100 ppm or less, or about 15 ppm to about 100 ppm, based on the ethylene content.

In this ethylene polymerization process, the transition metal compound of the present disclosures may exhibit high catalytic activity. For example, the catalyst activity during ethylene polymerization is about 4.8 kg PE/g·cat·hr or more, or about 4.8 kg PE/g·cat·hr to about 50 kg PE/g·cat·hr, or specifically 5.0 kg PE/g·cat·hr or more, or about 5.0 kg PE/g·cat·hr to about 40 kg PE/g·cat·hr, or more specifically about 5.1 kg PE/g·cat·hr or more, or about 5.1 kg PE/g·cat·hr to about 35 kg PE/g·cat·hr. Here, the catalyst activity is calculated as the ratio of the weight (kg PE) of polyethylene produced per the weight (g) of supported catalyst used based on unit time (h)

As described above, the polyethylene copolymer according to the present disclosure may be prepared by copolymerizing ethylene and alpha-olefin using the above-described supported metallocene catalyst.

Herein, the polyethylene to be prepared may be an ethylene-1-hexene copolymer.

According to another embodiment of the present disclosure, there is provided a polyethylene copolymer obtained by the above-described process.

The process for preparing the polyethylene copolymer may provide a polyethylene copolymer having excellent mechanical properties by performing slurry polymerization in the presence of the above-described hybrid supported metallocene catalyst.

Meanwhile, a linear low density polyethylene (LLDPE) is produced by copolymerizing ethylene and alpha olefin at low pressure using a polymerization catalyst. The linear low density polyethylene is a resin having a narrow molecular weight distribution and short chain branch of a predetermined length. In particular, the linear low density polyethylene film has high breaking strength and elongation, along with the characteristics of general polyethylene, and has excellent tear strength and dart drop impact strength. Thus, the linear low-density polyethylene film is increasingly used for stretch films, overlap films, and the like, which are difficult to apply to conventional low-density polyethylene or high-density polyethylene.

Further, the conventional linear low-density polyethylene is generally known to increase transparency and dart drop impact strength as the density decreases. However, when a lot of comonomer is used to produce low-density polyethylene, the occurrence of fouling increases in the slurry polymerization process, and the amount of antiblocking agent must be increased due to stickiness when manufacturing a film comprising the same. In addition, there is a problem that the process is unstable during production or the morphology characteristic of the polyethylene produced is deteriorated, so that the bulk density is reduced.

In the present disclosures, the above-described hybrid supported metallocene catalyst can provide a polyethylene copolymer having excellent mechanical properties and high dart drop impact strength of a film using the same, while preventing problems related to a decrease in productivity and fouling that occur conventionally when a low density polyethylene copolymer is prepared by slurry polymerization.

Accordingly, the polyethylene copolymer may be a low-density polyethylene having a density of about 0.930 g/cm$^3$ or less according to ASTM D 792 of the American Society for Testing and Materials. Specifically, the density is about 0.910 g/cm$^3$ or more, or about 0.911 g/cm$^3$ or more, or about 0.912 g/cm$^3$ or more, or about 0.913 g/cm$^3$ or more, or about 0.915 g/cm$^3$ or more, and about 0.925 g/cm$^3$ or less, about 0.923 g/cm$^3$ or less, or about 0.920 g/cm$^3$ or less, or about 0.918 g/cm$^3$ or less, or about 0.917 g/cm$^3$ or less, or about 0.9168 g/cm$^3$ or less. The density of the polyethylene copolymer should satisfy the above-described range in terms of securing excellent transparency and high impact strength during film processing.

The polyethylene copolymer may have a melt index (MI$_{2.16}$, 190° C., measured under a load of 2.16 kg), which is measured according to ASTM D 1238 of the American Society for Testing and Materials standard, of about 0.5 g/10 min to about 2.0 g/10 min. Specifically, the melt index (MI$_{2.16}$, 190° C., measured under a load of 2.16 kg) is about 0.7 g/10 min or more, about 0.8 g/10 min or more, about 0.9 g/10 min or more, or about 0.98 g/10 min or more, and about 1.8 g/10 min or less, or about 1.5 g/10 min or less.

In addition, the polyethylene copolymer may have a bulk density (BD) of about 0.2 g/mL or more, or about 0.2 g/mL to about 0.7 g/mL, measured according to the American Society for Testing and Materials standard ASTM D 1895. Specifically, the bulk density is about 0.25 g/mL or more, or about 0.3 g/mL or more, or about 0.35 g/mL or more, or about 0.4 g/mL or more, or about 0.41 g/mL or more, and about 0.6 g/mL or less, or about 0.5 g/mL or less, or about 0.48 g/mL or less, or about 0.47 g/mL or less, or about 0.46 g/mL or less, or about 0.45 g/mL or less. The bulk density should satisfy the above-mentioned range in terms of securing excellent morphology of the polyethylene copolymer.

In particular, the polyethylene copolymer may have a dart drop impact strength of a polyethylene copolymer film (BUR (blown up ratio) 2.3, film thickness 48 to 52 μm, for example, film thickness of 50 μm) prepared using a film applicator, measured according to the American Society for Testing and Materials standard ASTM D 1709, is 1200 g or more, or about 1200 g to about 3500 g. Specifically, the dart drop impact strength may be about 1350 g or more, or about 1500 g or more, or about 1550 g or more, or about 1600 g or more, or about 1650 g or more, or about 1700 g or more. The higher the dart drop impact strength value is, the better, so the upper limit is not particularly limited, but about 3200 g or less, or about 3000 g or less, or about 2800 g or less, or about 2500 g or less, or about 2200 g or less, or about 2000 g or less. The dart drop impact strength of the polyethylene copolymer should satisfy the above-mentioned range in terms of securing high mechanical properties along with excellent processability when forming a film such as a blown film.

Further, the polyethylene copolymer may have a haze of a polyethylene copolymer film (BUR 2.3, film thickness 48 to 52 μm, for example, film thickness of 50 μm) prepared using a film applicator, measured according to the International Organization for Standardization standard ISO 13468, is 12% or less. Specifically, the haze may be about 11% or less, or about 10% or less, or about 9% or less. The lower the haze value, the better, so the lower limit is not particularly limited, but may be, for example, about 4% or more, or about 5% or more, or about 6% or more.

Meanwhile, the polyethylene copolymer may have a molecular weight distribution (Mw/Mn) of about 2.0 to about 6.0, or about 2.0 to about 5.0, or about 2.0 to about 4.0.

For example, the molecular weight distribution (Mw/Mn) can be calculated by dividing the weight average molecular weight (Mw) by the number average molecular weight (Mn) after measuring the weight average molecular weight (Mw) and the number average molecular weight (Mn) using gel permeation chromatography (GPC, manufactured by Water).

Specifically, the weight average molecular weight (Mw) and the number average molecular weight (Mn) of the polyethylene copolymer can be measured by converting with a polystyrene standard specimen using gel permeation chromatography (GPC). For example, PL-GPC220 manufactured by Waters may be used as the gel permeation chromatography (GPC) instrument, and a Polymer Laboratories PLgel MIX-B 300 mm length column may be used. An evaluation temperature may be 160° C., and 1,2,4-trichlorobenzene may be used for a solvent at a flow rate of 1 mL/min. Each polyethylene sample may be pretreated by dissolving in 1,2,4-trichlorobenzene containing 0.0125% of BHT at 160° C. for 10 hours using a GPC analyzer (PL-GP220), and the sample with a concentration of 10 mg/10 mL may be supplied in an amount of 200 μL. Mw and Mn may be obtained using a calibration curve formed using a polystyrene standard. 9 kinds of the polystyrene standard may be used with the weight average molecular weight of 2000 g/mol, 10000 g/mol, 30000 g/mol, 70000 g/mol, 200000 g/mol, 700000 g/mol, 2000000 g/mol, 4000000 g/mol, and 10000000 g/mol.

The polyethylene copolymer may have a weight average molecular weight of about 50000 g/mol to about 200000 g/mol. Specifically, the polyethylene copolymer may have a weight average molecular weight of about 60000 g/mol or more, or about 65000 g/mol or more, or about 70000 g/mol or more, and about 190000 g/mol or less, or about 180000 g/mol or less, or about 150000 g/mol or less.

Accordingly, the polyethylene copolymer of the present disclosure can be used for various applications requiring such physical properties. In particular, it can be used for agricultural/industrial and packaging applications requiring high dart drop impact resistance. It can also be used for shrink films where it is difficult to apply conventional low density polyethylene or high density polyethylene.

Advantageous Effects

The hybrid supported metallocene catalyst according to the present disclosure exhibits excellent process stability and high activity for ethylene polymerization, and can prepare a polyethylene copolymer having excellent mechanical properties by increasing comonomer incorporation during the ethylene polymerization.

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

EXAMPLES

<Preparation of First Metallocene Compound>

Synthesis Example 1

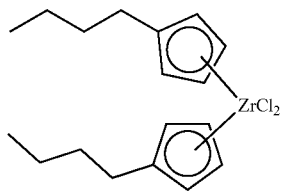

n-butyl chloride and sodium cyclopentadienyl (NaCp) were reacted to obtain n-butyl cyclopentadiene (n-BuCp). Thereafter, n-BuCp was dissolved in tetrahydrofuran (THF) at −78° C., normal butyllithium (n-BuLi, 2.5 M in hexane) was slowly added thereto, and then the temperature was raised to room temperature, followed by carrying out the reaction for 8 hours. The prepared lithium salt solution was cooled to −78° C. and was slowly added to a suspension solution of $ZrCl_4(THF)_2$ (1.70 g, 4.50 mmol)/THF (30 mL) at the temperature. Then, the reactant mixture was raised to room temperature, followed by carrying out the reaction for 6 hours. Thereafter, all volatile substances of the reactant mixtures were removed by vacuum-drying, and a hexane solvent was added to the obtained oily liquid substance, followed by the filtration to obtain a solution containing the product of the reaction. After vacuum drying the filtered solution, hexane was added to induce precipitation at low temperature (−20° C.). The obtained precipitate was filtered at low temperature to obtain $[(CH_3)(CH_2)_3—C_5H_4]_2ZrCl_2$ in the form of white solid (yield 50%).

Synthesis Example 2

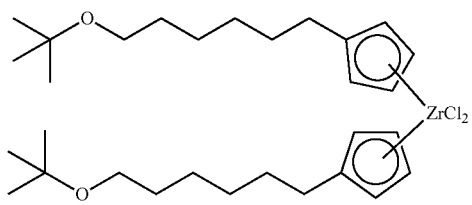

t-butyl-O—$(CH_2)_6$—Cl was prepared using 6-chlorohexanol by a method described in the document (Tetrahedron Lett. 2951, 1988), and was reacted with sodium cyclopentadienyl (NaCp) to obtain t-butyl-O—$(CH_2)_6$—$C_5H_5$ (yield 60%, b.p. 80° C./0.1 mmHg).

Further, the t-butyl-O—$(CH_2)_6$—$C_5H_5$ was dissolved in tetrahydrofurane (THF) at −78° C., normal butyllithium (n-BuLi, 2.5 M in hexane) was slowly added thereto, and then the temperature was raised to room temperature, followed by carrying out the reaction for 8 hours. The prepared lithium salt solution was cooled to −78° C. and was slowly added to a suspension solution of $ZrCl_4(THF)_2$ (1.70 g, 4.50 mmol)/THF (30 mL) at the temperature. Then, the reactant mixture was raised to room temperature, followed by carrying out the reaction for 6 hours. Thereafter, all volatile substances of the reactant mixtures were removed by vacuum-drying, and a hexane solvent was added to the obtained oily liquid substance, followed by the filtration to obtain a solution containing the product of the reaction. After vacuum drying the filtered solution, hexane was added to induce precipitation at low temperature (−20° C.). The obtained precipitate was filtered at low temperature to obtain [tert-butyl-O—$(CH_2)_6$—$C_5H_4]_2ZrCl_2$] in the form of white solid (yield 92%).

$^1$H-NMR (300 MHz, $CDCl_3$, ppm): δ 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C-NMR (300 MHz, $CDCl_3$, ppm): δ 135.09, 116.66, 112.28, 72.42, 61.52, 30.66, 30.31, 30.14, 29.18, 27.58, 26.00.

Comparative Synthesis Example 1

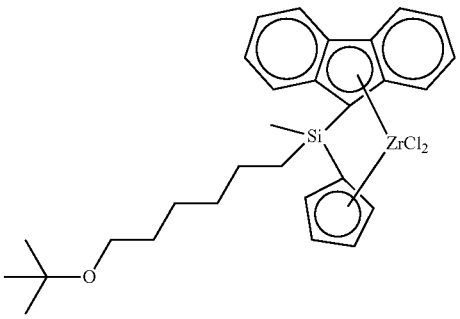

Synthesis of (6-t-butoxyhexyl)(fluorenyl)methylsilane

The compound t-butyl-O—$(CH_2)_6$Cl and Mg(0) were reacted in diethyl ether ($Et_2O$) to obtain 0.14 mol of a Grignard reagent tBu-O—$(CH_2)_6$MgCl solution. At the temperature of −100° C., a methyltrichlorosilane ($MeSiCl_3$) compound (24.7 mL, 0.21 mol) was added, and then stirred at room temperature for 3 hours or more. After completion of the reaction, a filtering was performed and the filtered solution was vacuum dried to obtain (6-t-butoxyhexyl)methylsilane dichloride [tBu-O—$(CH_2)_6SiMeCl_2$] (yield 84%). A solution of fluorenyllithium (4.82 g, 0.028 mol)/hexane (150 mL) was added slowly to a solution of tBu-O—$(CH_2)_6SiMeCl_2$ (7.7 g, 0.028 mol) in hexane (50 mL) at the temperature of −78° C. during 2 hours. Then, a white precipitate (LiCl) was filtered off, and the desired product was extracted with hexane. After all volatile substances in the hexane solution were removed by vacuum drying, the compound of (6-(t-butoxy)hexyl)fluorenylmethylsilane [tBu-O—$(CH_2)_6)SiMe(9-C_{13}H_{10})$] was obtained in form of light yellow oil (yield 99%).

Synthesis of (t-butoxyhexyl)(cyclopentadienyl)(fluorenyl)methylsilane

A THF solvent (50 mL) was added to the above compound, and reacted with a $C_5H_5Li$ (2.0 g, 0.028 mol)/THF (50 mL) solution for 3 hours or more at room temperature. After all volatile substances in the reaction resultant were removed by vacuum drying, the dried resultant was carried out by extracting with hexane to obtain the final ligand compound of (t-butoxyhexyl)(cyclopentadienyl)(fluorenyl) methylsilane [(tBu-O—(CH$_2$)$_6$)(CH$_3$)Si(C$_5$H$_5$)(9-C$_{13}$H$_{10}$)] in orange oil form (yield 95%). The structure of the ligand was confirmed through $^1$H-NMR.

Synthesis of (t-butoxyhexyl)(methyl)silanyl(cyclopentadienyl)(fluorenyl) Zirconium Dichloride Further, with 2 equivalents of n-BuLi was added to (t-butoxyhexyl)(cyclopentadienyl)(fluorenyl)methylsilane [(tBu-O—(CH$_2$)$_6$)(CH$_3$)Si(C$_5$H$_5$)(9-C1$_3$H$_{10}$)] (12 g, 0.028 mol)/THF (100 mL) at the temperature of −78° C. After completion of the addition, the temperature of the reaction was raised to room temperature and the reaction was carried out for 4 hours or more to obtain a dilithium salt of (tBu-O—(CH$_2$)$_6$)(CH$_3$)Si(C$_5$H$_5$Li)(9-C$_{13}$H$_{10}$Li) in the form of an orange solid (yield 81%). Thereafter, the solution of the dilithium salt (2.0 g, 4.5 mmol)/ether (30 mL) was added slowly to a suspension solution of ZrCl$_4$ (1.05 g, 4.50 mmol)/ether (30 mL) at the temperature of −78° C. The reaction was further carried out at room temperature for 3 hours. After all volatile substances in the resultant solution were removed by vacuum drying, a dichloromethane solvent was added to the obtained oily liquid substance and a filtration was carried out to take off some solid substances. After vacuum drying the filtered solution, hexane was added to induce a precipitate. The resulting precipitate was washed several times with hexane. Then, racemic-(t-butoxyhexyl) (methyl)silanyl(cyclopentadienyl)(fluorenyl)zirconium dichloride [racemic-(t-Bu-) in the form of a red solid [racemic-(t-Bu-)O—(CH$_2$)$_6$)(CH$_3$)Si(C$_5$H$_4$)(9-C$_{13}$H$_9$)ZrCl$_2$] was obtained in the form of a red solid (yield 54%).

Comparative Synthesis Example 2

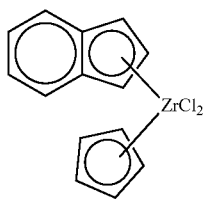

Indene (5 g, 0.043 mol) was dissolved and thoroughly mixed in hexane (150 mL). Thereafter, the temperature of the reactant was cooled to −30° C., and 2.5 M n-butyllithium (n-BuLi) hexane solution (17 ml, 0.043 mol) was added dropwise to the reactant. Then, the temperature of the reaction was gradually raised to room temperature, followed by stirring at room temperature for 12 hours. The resulting white suspension was filtered through a glass filter to obtain a white solid compound. After drying the white solid compound sufficiently, indene lithium salt was obtained (yield: 99% yield).

Cyclopentadienyl zirconium trichloride (Cp-ZrCl$_3$, 2.24 g, 8.53 mmol) was slowly dissolved in diethyl ether (30 mL) and then the temperature of the reaction was cooled to −30° C. To the diethyl ether solution comprising CpZrCl$_3$, the solution of the above indene lithium salt (1.05 g, 8.53 mmol) dissolved in diethyl ether (15 mL) was added dropwise and then was stirred overnight. Then, indenyl(cyclopentadienyl) zirconium dichloride [Indenyl(cyclopentadienyl)ZrCl$_2$] was obtained (yield: 97%).

Comparative Synthesis Example 3

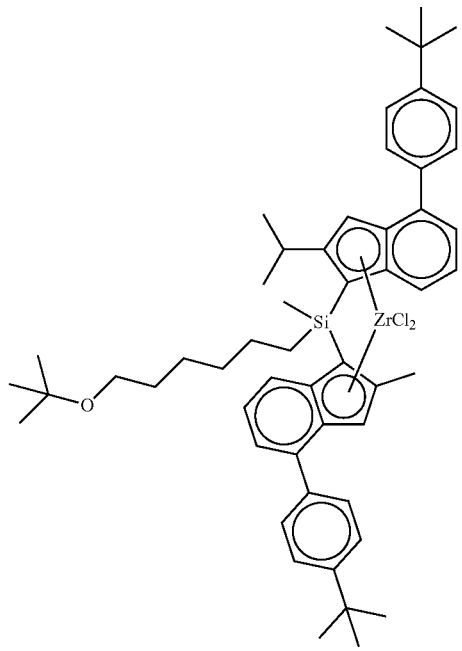

Synthesis of (6-t-butoxyhexyl)dichloromethylsilane 100 mL of t-butoxyhexyl magnesium chloride solution (0.14 mol, ether) was added dropwise to 100 mL of trichloromethylsilane solution (0.21 mol, hexane) at −100° C. during 3 hours. Then, the temperature of the reaction was raised to room temperature, followed by stirring at room temperature for 3 hours.

After separating the transparent organic layer from the mixed solution, the separated transparent organic layer was vacuum dried to remove excess trichloromethylsilane. Thus, a transparent liquid (6-t-butoxyhexyl)dichloromethylsilane was obtained (yield 84%).

$^1$H NMR (500 MHz, CDCl$_3$, 7.24 ppm): δ 0.76 (3H, s), 1.11 (2H, t), 1.18 (9H, s), 1.32-1.55 (8H, m), 3.33 (2H, t).

Synthesis of (6-(t-butoxy)hexyl)(4-(4-(t-butyl)phenyl)-2-methyl-1H-inden-1-yl)(methyl)(2-isopropyl-4-(4-(t-butyl)phenyl)-1H-inden-1-yl)silane 20 g (76.222 mmol) of 2-methyl-4-(4-(t-butyl)phenyl) indene was dissolved in 640 mL of a mixed solvent of hexane and methyl tertiary butyl ether (MTBE) (Hex/MTBE=15/1 volume ratio). Thereafter, 33.5 mL of n-BuLi (2.5 M in hexane) was added dropwise to the solution at −20° C. After stirring the resulting reaction mixture at room temperature for one day, 80.5 mL of a solution of 19.7 g (72.411 mmol) of (6-t-butoxyhexyl)dichloromethylsilane dissolved in hexane was added slowly to the resulting reaction mixture at −20° C. Then, the resulting reaction mixture was stirred at room temperature for one day. After a volatile solvent in the resulting reaction mixture were removed by vacuum drying, a hexane was added to the dried reaction mixture and a vacuum filtration was carried out again. After drying the filtered solution, monosilane compound was obtained.

Meanwhile, in another flask, 22.1 g (76.222 mmol) of 2-isopropyl-4-(4-(t-butyl)phenyl)indene and 136.5 mg (1.525 mmol) of CuCN were dissolved in 200 mL of diethyl ether. Thereafter, 33.5 mL of n-butyllithium solution (2.5 M in hexane) was added dropwise to the diethyl ether solution at −20° C. Then, after the resulting reaction mixture was stirred at room temperature for one day, the monosilane prepared above was dissolved in 180 mL of diethyl ether and was added to the resulting reaction mixture. Thereafter, the resulting reaction mixture was stirred at room temperature for one day, an organic material was extracted using water and MTBE, and was vacuum dried. Then, the dried product under reduced pressure was purified through column chromatography to obtain the final ligand in a yield of 67%.

Synthesis of 6-(t-Butoxy)hexyl)(4-(4-(t-butyl)phenyl)-2-methyl-1H-inden-1-yl)(methyl)(2-isopropyl-4-(4-(t-Butyl)phenyl)-1H-inden-1-yl)silane Zirconium Dichloride (6-(t-butoxy)hexyl)(4-(4-(t-butyl)phenyl)-2-methyl-1H-inden-1-yl)(methyl)(2-isopropyl-4-(4-(t-butyl)phenyl)-1H-inden-1-yl)silane 1.00 g (1.331 mmol) prepared above was dissolved in 33 mL of diethyl ether, and then 1.1 mL of n-butyllithium solution (2.5 M in hexane) was added dropwise to the ether soliton. After the resulting reaction mixture was stirred at room temperature for about 4 hours, a solution prepared by dissolving 706 mg (1.331 mmol) of bis(N,N'-diphenyl-1,3-propanediamido)dichlorozirconium bis(tetrahydrofuran) [Zr(C$_5$H$_6$NCH$_2$CH$_2$CH$_2$NC$_5$H$_6$)Cl$_2$(C$_4$H$_5$O)$_2$] in 33 mL of diethyl ether was added to the resulting reaction mixture at room temperature, followed by stirring for one day. Thereafter, the red reaction solution was cooled to −20° C., and 4 equivalents of a 1 M HCl diethyl ether solution was added dropwise to the cooled solution, and then the resulting solution was stirred again at room temperature for 1 hour. After filtration and vacuum drying, the obtained solid was dissolved in pentane and then solid crystals were precipitated for 48 hours. After filtration under reduced pressure, the solid crystals were dried to obtain an orange transition metal compound, (6-(t-butoxy)hexyl)(4-(4-(t-butyl)phenyl)-2-methyl-1H-inden-1-yl)(methyl)(2-isopropyl-4-(4-(t-butyl)phenyl)-1H-inden-1-yl) silane zirconium dichloride in a yield of 8% (rac only).

$^1$H NMR (500 MHz, CDCl$_3$, 7.26 ppm): δ 1.05 (3H, d), 1.09 (3H, d), 1.20 (3H, s), 1.34 (9H, s), 1.50-1.93 (10H, m), 2.27-2.31 (1H, m), 3.37 (2H, t), 6.48 (1H, s) 6.98 (1H, s), 7.01 (1H, s), 7.09-7.12 (2H, m), 7.34-7.70 (12H, m).

<Preparation of Second Metallocene Compound>

Synthesis Example 3

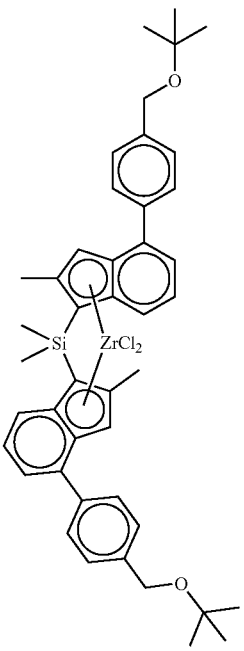

Synthesis of 1-bromo-4-(tert-butoxymethyl)benzene

H$_2$SO$_4$ (1.47 mL) and anhydrous MgSO$_4$ (12.9 g, 107 mmol) were added to CH$_2$Cl$_2$ (80 mL) and then stirred at room temperature for 15 minutes. In another flask, 4-bromobenzyl alcohol (5.0 g, 26.7 mmol) and t-butanol (12.8 mL, 134 mmol) were dissolved in CH$_2$Cl$_2$ (30 mL) and then the above mixture was added thereto. The mixture was then stirred at room temperature overnight and then sat. NaHCO$_3$ was added. Water was removed with anhydrous MgSO$_4$, and the resulting solution was concentrated under reduced pressure and then purified by column chromatography (E/H=1/20) to obtain 1-bromo-4-(tert-butoxymethyl)benzene (5.9 g, 90%) as a white solid.

$^1$H NMR (500 MHz, CDCl$_3$, 7.24 ppm): δ 1.28 (9H, s), 4.39 (2H, s), 7.22 (2H, d), 7.44 (2H, d).

Synthesis of 7-((4-tert-butoxymethyl)phenyl)-2-methyl-1H-indene 1-bromo-4-(tert-butoxymethyl)benzene (4.52 g, 18.6 mmol) was dissolved in anhydrous THF (20 mL) under argon (Ar). The temperature was lowered to −78° C., and an n-butyllithium solution (n-BuLi, 2.5 M in hexane, 8.2 mL) was added, followed by stirring at room temperature for 30 minutes. The temperature was lowered again to −78° C., trimethyl borate (6.2 mL, 55.6 mmol) was added and then stirred at room temperature overnight. A saturated NH$_4$Cl solution (sat. NH$_4$Cl) was added to the reaction solution and then extracted with MTBE. Anhydrous MgSO$_4$ was added and water was removed by filtration. The solution was concentrated under reduced pressure and the subsequent reaction was carried out without further purification.

The above obtained compound and 7-bromo-2-methyl-1H-indene (3.87 g, 18.6 mmol) and Na$_2$CO$_3$ (5.91 g, 55.8 mmol) were added to a mixed solvent of toluene (40 mL), H$_2$O (20 mL), and EtOH (20 mL) and stirred. Pd(PPh$_3$)$_4$ (1.07 g, 0.93 mmol) was added to the above solution and then stirred at 90° C. overnight. After the reaction was completed, MTBE and water were added and the organic layer was separated. Water was removed with anhydrous MgSO$_4$. The obtained solution was concentrated under reduced pressure and then purified by column chromatography (E/H=1/30) to obtain 7-(4-tert-butoxymethyl)phenyl)-2-methyl-1H-indene (2.9 g, 53%).

$^1$H NMR (500 MHz, CDCl$_3$, 7.24 ppm): δ 1.33 (9H, s), 2.14 (3H, s), 3.36 (2H, s), 4.50 (2H, s), 6.53 (1H, s), 7.11-7.45 (7H, m).

Synthesis of bis(4-(4-tert-butoxymethyl)phenyl)-2-methyl-1H-inden-1-yl)dimethylsilane 7-((4-tert-butoxymethyl)phenyl)-2-methyl-1H-indene (2.88 g, 9.85 mmol) and CuCN (44 mg, 0.49 mmol) were dissolved in toluene (18 mL) and THF (2 ml) under argon (Ar). This solution was cooled to −30° C. and n-BuLi (2.5 M in hexane, 4.1 mL) was slowly added. After stirring at this temperature for about 20 minutes, the temperature was raised to room temperature and the stirring was carried out for 2.5 hours. Dichlorodimethylsilane (0.59 mL, 4.89 mmol) was added to this solution and then stirred at room temperature overnight. After the reaction was completed, MTBE and water were added and the organic layer was separated. The obtained organic layer was dried over anhydrous MgSO$_4$ to remove water, and was concentrated under reduced pressure, and then was purified by column chromatography (hexane) to obtain bis(4-(4-tert-butoxymethyl)phenyl)-2-methyl-1H-inden-1-yl) dimethylsilane (2.95 g, 93%) as a white solid.

$^1$H NMR (500 MHz, CDCl$_3$, 7.24 ppm): δ −0.20 (6H, s), 1.35 (18H, s), 2.19 (3H, s), 2.25 (3H, s), 3.81 (2H, s), 4.53 (4H, s), 6.81 (2H, s), 7.18-7.52 (14H, m).

Synthesis of dimethylsilanyl-bis(4-(4-tert-butoxymethyl)phenyl)-2-methyl-1H-inden-1-yl)Zirconium Dichloride Bis(4-(4-tert-butoxymethyl)phenyl)-2-methyl-1H-inden-1-yl)-dimethyl-silane (2.0 g, 3.12 mmol) was added to a 50 mL Schlenk flask under argon (Ar) and dissolved by injecting diethyl ether (20 mL). The temperature was lowered to −78° C., and n-BuLi (2.5 M in hexane, 2.7 mL) was added and then stirred at room temperature for 2 hours. The solvent was distilled under vacuum/reduced pressure, ZrCl$_4$(THF)$_2$ (1.18 g, 3.12 mmol) mmol) was added therein in a glove box, and the temperature was lowered to −78° C. Diethyl ether (20 mL) was added to the mixture and then the temperature was raised to room temperature, followed by stirring overnight. The solvent was distilled under reduced pressure and dissolved in CH$_2$Cl$_2$ to remove the solid. The solution was concentrated under reduced pressure, and the obtained solid was washed with toluene and CH$_2$Cl$_2$ to obtain dimethylsilanyl-bis(4-(4-tert-butoxymethyl)phenyl)-2-methyl-1H-inden-1-yl)zirconium dichloride (260 mg, 10%, r/m about 16/1) as a racemic-rich yellow solid.

$^1$H NMR (500 MHz, CDCl$_3$, 7.24 ppm): δ 1.28 (18H, s), 1.33 (6H, s), 2.24 (6H, s), 4.46 (4H, s), 6.93 (2H, s), 7.08-7.65 (14H, m).

Synthesis Example 4

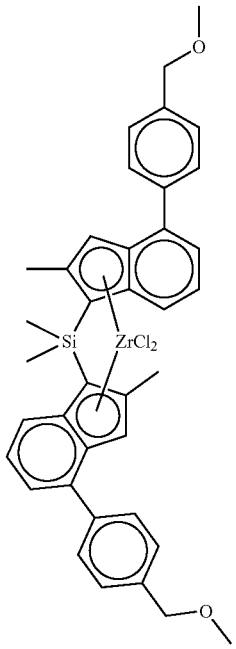

Synthesis of 1-bromo-4-(methoxymethyl)benzene

DMSO (117 mL)/KOH (214 mmol, 12 g) was added to a flask, and 4-bromobenzyl alcohol (53.5 mmol, 10.0 g) was added and then stirred at room temperature for 1 hour. MeI (107 mmol, 6.6 mL) was added to the reaction product and then stirred for 10 minutes. After the reaction was completed, the reaction mixture was poured into H$_2$O and then extracted with CH$_2$Cl$_2$. The organic layer was dried over anhydrous MgSO$_4$ and then vacuum dried to obtain 1-bromo-4-methoxymethyl benzene (10.6 g, 99%).

$^1$H NMR (500 MHz, CDCl$_3$, 7.24 ppm): δ 3.41 (3H, s), 4.39 (2H, s), 7.11-7.53 (4H, m)

Synthesis of 7-(4-methoxymethyl)phenyl)-2-methyl-1H-indene 1-bromo-4-(methoxymethyl)benzene (9.3 g, 46.3 mmol) was dissolved in anhydrous THF (40 mL) under argon (Ar). The temperature was lowered to −78° C., and an n-butyllithium solution (n-BuLi, 2.5 M in hexane, 20.4 mL) was added, followed by stirring at room temperature for 30 minutes. The temperature was lowered again to −78° C., and trimethyl borate (15.5 mL, 139 mmol) was added and then stirred at room temperature overnight. Sat. NH$_4$Cl was added to the reaction solution and then extracted with MTBE. Anhydrous MgSO$_4$ was added and water was removed by filtration. The solution was concentrated under reduced pressure and the subsequent reaction was carried out without further purification.

The above obtained compound, 7-bromo-2-methyl-1H-indene (9.63 g, 46.3 mmol), and Na$_2$CO$_3$ (14.7 g, 139 mmol) were added to a mixed solvent of toluene (80 mL), H$_2$O (40 mL), and EtOH (40 mL) and stirred. Pd(PPh$_3$)$_4$ (1.07 g, 2.32 mmol) was added to the above solution and then stirred at 90° C. overnight. After the reaction was completed, MTBE and water were added and the organic layer was separated. Water was removed with anhydrous MgSO$_4$. The obtained solution was concentrated under reduced pressure and then purified by column chromatography (E/H=1/30) to obtain 7-(4-(methoxymethyl)phenyl)-2-methyl-1H-indene (6.9 g, 60%).

$^1$H NMR (500 MHz, CDCl$_3$, 7.24 ppm): δ 2.15 (3H, s), 3.35 (2H, s), 3.38 (3H, s), 4.48 (2H, s), 6.55 (1H, s), 7.05-7.44 (7H, m)

Synthesis of bis(4-(4-methoxymethyl)phenyl)-2-methyl-1H-inden-1-yl)dimethylsilane 7-(4-methoxymethyl)phenyl)-2-methyl-1H-indene (4.21 g, 16.8 mmol) and CuCN (75 mg, 0.84 mmol) were dissolved in toluene (36 mL) and THF (4 ml) under argon (Ar). This solution was cooled to −30° C. and n-BuLi (2.5 M in hexane, 7.4 mL) was slowly added. After stirring at this temperature for about 20 minutes, the temperature was raised to room temperature and then stirring was carried out for 2.5 hours. Dichlorodimethylsilane (1.01 mL, 8.4 mmol) was added to this solution and then stirred at room temperature overnight. After the reaction was completed, MTBE and water were added and the organic layer was separated. The obtained organic layer was dried over anhydrous MgSO$_4$ to remove water, concentrated under reduced pressure, and then purified by column chromatography (hexane) to obtain bis(4-(4-methoxymethyl)phenyl)-2-methyl-1H-inden-1-yl)dimethylsilane (4.21 g, 90%) as a white solid.

$^1$H NMR (500 MHz, CDCl$_3$, 7.24 ppm): δ −0.21 (6H, s), 2.20 (3H, s), 2.23 (3H, s), 3.40 (6H, s), 3.82 (2H, s), 4.50 (4H, s), 6.79 (2H, s), 7.15-7.53 (14H, m)

Synthesis of dimethylsilanyl-bis(4-(4-methoxymethyl)phenyl)-2-methyl-1H-inden-1-yl)zirconium Dichloride Bis(4-(4-methoxymethyl)phenyl)-2-methyl-1H-inden-1-yl)-dimethyl-silane (3.0 g, 5.39 mmol) was added to a 50 mL Schlenk flask under argon (Ar) and dissolved by injecting diethyl ether (30 mL). The temperature was lowered to −78° C., n-BuLi (2.5 M in hexane, 4.7 mL) was added, and then stirred at room temperature for 2 hours. The solvent was distilled under reduced pressure, ZrCl$_4$(THF)$_2$ (2.04 g, 5.39 mmol) was added therein in a glove box, and the temperature was lowered to −78° C. Diethyl ether (30 mL) was added to the mixture, the temperature was raised to room temperature, and stirring was carried out overnight. The solvent was distilled under reduced pressure and dissolved in CH$_2$Cl$_2$ to remove the solid. The solution was concentrated under reduced pressure and the obtained solid was washed with toluene and CH$_2$Cl$_2$ to obtain dimethylsilanyl-bis(4-(4-methoxymethyl)phenyl)-2-methyl-1H-inden-1-yl)zirconium dichloride (425 mg, 11%, r/m about 10/1) as a racemic-rich yellow solid.

$^1$H NMR (500 MHz, CDCl$_3$, 7.24 ppm): δ 1.31 (6H, s), 2.22 (6H, s), 3.39 (6H, s), 4.43 (4H, s), 6.91 (2H, s), 7.09-7.64 (14H, m).

Synthesis Example 5

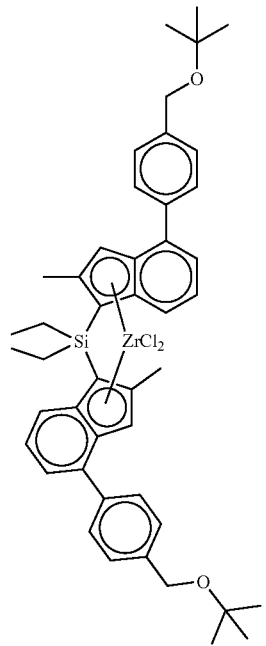

Synthesis of 1-bromo-4-(tert-butoxymethyl)benzene

H$_2$SO$_4$ (1.47 mL) and anhydrous MgSO$_4$ (12.9 g, 107 mmol) were added to CH$_2$Cl$_2$ (80 mL) and then stirred at room temperature for 15 minutes. In another flask, 4-bromobenzyl alcohol (5.0 g, 26.7 mmol) and t-butanol (12.8 mL, 134 mmol) were dissolved in CH$_2$Cl$_2$ (30 mL) and then the above mixture was added thereto. The mixture was then stirred at room temperature overnight and then sat. NaHCO$_3$ was added. Water was removed with anhydrous MgSO$_4$, and the resulting solution was concentrated under reduced pressure and then purified by column chromatography (E/H=1/20) to obtain 1-bromo-4-(tert-butoxymethyl)benzene (5.9 g, 90%) as a white solid.

$^1$H NMR (500 MHz, CDCl$_3$, 7.24 ppm): δ 1.28 (9H, s), 4.39 (2H, s), 7.22 (2H, d), 7.44 (2H, d).

Synthesis of 7-(4-tert-butoxymethyl)phenyl)-2-methyl-1H-indene 1-bromo-4-(tert-butoxymethyl)benzene (4.52 g, 18.6 mmol) was dissolved in anhydrous THF (20 mL) under argon (Ar). The temperature was lowered to −78° C., and an n-butyllithium solution (n-BuLi, 2.5 M in hexane, 8.2 mL) was added, followed by stirring at room temperature for 30 minutes. The temperature was lowered again to −78° C., trimethyl borate (6.2 mL, 55.6 mmol) was added and then stirred at room temperature overnight. A saturated NH$_4$Cl solution (sat. NH$_4$Cl) was added to the reaction solution and then extracted with MTBE. Anhydrous MgSO$_4$ was added and water was removed by filtration. The solution was concentrated under reduced pressure and the subsequent reaction was carried out without further purification.

The above obtained compound and 7-bromo-2-methyl-1H-indene (3.87 g, 18.6 mmol) and Na$_2$CO$_3$ (5.91 g, 55.8 mmol) were added to a mixed solvent of toluene (40 mL), H₂O (20 mL), and EtOH (20 mL) and stirred. Pd(PPh₃)₄ (1.07 g, 0.93 mmol) was added to the above solution and then stirred at 90° C. overnight. After the reaction was completed, MTBE and water were added and the organic layer was separated. Water was removed with anhydrous MgSO₄. The obtained solution was concentrated under reduced pressure and then purified by column chromatography (E/H=1/30) to obtain 7-(4-tert-butoxymethyl)phenyl)-2-methyl-1H-indene (2.9 g, 53%).

$^1$H NMR (500 MHz, CDCl₃, 7.24 ppm): δ 1.33 (9H, s), 2.14 (3H, s), 3.36 (2H, s), 4.50 (2H, s), 6.53 (1H, s), 7.11-7.45 (7H, m).

Synthesis of bis(4-(4-tert-butoxymethyl)phenyl)-2-methyl-1H-inden-1-yl)diethylsilane 7-(4-tert-butoxymethyl)phenyl)-2-methyl-1H-indene (2.88 g, 9.85 mmol) and CuCN (44 mg, 0.49 mmol) were dissolved in toluene (18 mL) and THF (2 ml) under argon (Ar). This solution was cooled to −30° C. and n-BuLi (2.5 M in hexane, 4.1 mL) was slowly added. After stirring at this temperature for about 20 minutes, the temperature was raised to room temperature and the stirring was carried out for 2.5 hours. Dichlorodiethylsilane (0.73 mL, 4.89 mmol) was added to this solution and then stirred at room temperature overnight. After the reaction was completed, MTBE and water were added and the organic layer was separated. The obtained organic layer was dried over anhydrous MgSO₄ to remove water, concentrated under reduced pressure and then purified by column chromatography (hexane) to obtain bis(4-(4-tert-butoxymethyl)phenyl)-2-methyl-1H-inden-1-yl) diethylsilane (2.95 g, 93%) as a white solid.

$^1$H NMR (500 MHz, CDCl₃, 7.24 ppm): δ −0.20 (6H, s), 1.35 (18H, s), 2.19 (3H, s), 2.25 (3H, s), 3.81 (2H, s), 4.53 (4H, s), 6.81 (2H, s), 7.18-7.52 (14H, m).

Synthesis of diethylsilanyl-bis(4-(4-tert-butoxymethyl)phenyl)-2-methyl-1H-inden-1-yl)Zirconium Dichloride Bis(4-(4-tert-butoxymethyl)phenyl)-2-methyl-1H-inden-1-yl)-diethyl-silane (2.0 g, 3.12 mmol) was added to a 50 mL Schlenk flask under argon (Ar) and dissolved by injecting diethyl ether (20 mL). The temperature was lowered to −78° C., and n-BuLi (2.5 M in hexane, 2.7 mL) was added and then stirred at room temperature for 2 hours. The solvent was distilled under vacuum/reduced pressure, ZrCl₄(THF)₂ (1.18 g, 3.12 mmol) mmol) was added therein in a glove box, and the temperature was lowered to −78° C. Diethyl ether (20 mL) was added to the mixture and then the temperature was raised to room temperature, followed by stirring overnight. The solvent was distilled under reduced pressure and dissolved in CH₂Cl₂ to remove the solid. The solution was concentrated under reduced pressure, and the obtained solid was washed with toluene and CH₂Cl₂ to obtain diethylsilanyl-bis(4-(4-tert-butoxymethyl)phenyl)-2-methyl-1H-inden-1-yl)zirconium dichloride (260 mg, 10%, r/m about 16/1) as a racemic-rich yellow solid.

$^1$H NMR (500 MHz, CDCl₃, 7.24 ppm): δ 1.28 (18H, s), 1.33 (6H, s), 2.24 (6H, s), 4.46 (4H, s), 6.93 (2H, s), 7.08-7.65 (14H, m).

Comparative Synthesis Example 4

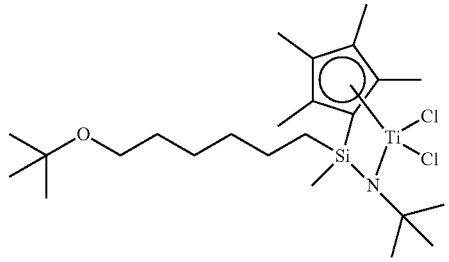

Synthesis of methyl(6-tertiary-butoxyhexyl)dichlorosilane 50 g of Mg (s) was added to a 10 L reactor at room temperature, followed by 300 mL of THF. 0.5 g of I₂ was added, and the reactor temperature was maintained at 50° C. After the reactor temperature was stabilized, 250 g of 6-t-butoxyhexyl chloride was added to the reactor at a rate of 5 mL/min using a feeding pump. As the 6-t-butoxyhexyl chloride was added, it was observed that the temperature of the reactor was raised by about 4° C. to 5° C. While continuously adding 6-t-butoxyhexyl chloride, the mixture was stirred for 12 hours to obtain a black reaction solution. 2 mL of the black solution was taken to which water was added to obtain organic layers. The organic layers were confirmed to be 6-t-butoxyhexane through $^1$H-NMR. It was confirmed therefrom that the Grignard reaction was well performed. Consequently, 6-t-butoxyhexyl magnesium chloride was synthesized.

500 g of MeSiCl₃ and 1 L of THF were added to a reactor, and then the reactor temperature was cooled down to −20° C. 560 g of the previously synthesized 6-t-butoxyhexyl magnesium chloride was added to the reactor at a rate of 5 mL/min using a feeding pump. After completion of the feeding of Grignard reagent, the mixture was stirred for 12 hours while slowly raising the reactor temperature to room temperature, and it was confirmed that a white MgCl₂ salt was formed. 4 L of hexane was added thereto and the salt was removed through a labdori to obtain a filtered solution. After the filtered solution was added to the reactor, hexane was removed at 70° C. to obtain a pale yellow liquid. The obtained liquid was confirmed to be the desired methyl(6-t-butoxy hexyl)dichlorosilane through 1H-NMR.

$^1$H-NMR (500 MHz, CDCl₃): δ 3.3 (t, 2H), 1.5 (m, 3H), 1.3 (m, 5H), 1.2 (s, 9H), 1.1 (m, 2H), 0.7 (s, 3H).

Synthesis of methyl (6-tertiary-butoxyhexyl) (tetramethylcyclopentadienyl)-tert-butylaminosilane 1.2 mol (150 g) of tetramethylcyclopentadiene and 2.4 L of THF were added to the reactor, and then the reactor temperature was cooled down to −20° C. 480 mL of n-BuLi (2.5 M, in hexane) was added to the reactor at a rate of 5 ml/min using a feeding pump. After n-BuLi was added, the mixture was stirred for 12 hours while slowly raising the reactor temperature to room temperature. Thereafter, an equivalent of methyl(6-t-butoxyhexyl)dichlorosilane (326 g, 350 mL) was rapidly added to the reactor. The mixture was stirred for 12 hours while slowly raising the reactor temperature to room temperature. Then, the reactor temperature was cooled to 0° C. again, and 2 equivalents of t-BuNH₂ was added. The mixture was stirred for 12 hours while slowly raising the reactor temperature to room temperature. Then, THF was removed and 4 L of hexane was added to obtain a filtered solution from which the salt was removed through a labdori. The filtered solution was added to the reactor again, and hexane was removed at 70° C. to obtain a yellow solution. This was confirmed to be methyl(6-t-butoxyhexyl)(tetramethylCpH)t-butylaminosilane through $^1$H-NMR.

Synthesis of (tertiary-butoxyhexyl)methylsilanyl (tetramethylcyclopentadienyl)(tertiary-butyl amino)titanium Dichloride 10 mmol of TiCl$_3$(THF)$_3$ was rapidly added to a dilithium salt of a ligand at −78° C., which was synthesized from n-BuLi and the ligand of dimethyl(tetramethylCpH)t-butylaminosilane in THF solution. The reaction solution was stirred for 12 hours while slowly raising the temperature from −78° C. to room temperature. Then, an equivalent of PbCl$_2$ (10 mmol) was added at room temperature, and the mixture was stirred for 12 hours to obtain a dark black solution with blue color. After removing THF from the resulting reaction solution, hexane was added to filter the product. Hexane was removed from the filtered solution, and then the product was confirmed to be the desired tBu-O—(CH$_2$)$_6$](CH$_3$)Si(C$_5$(CH$_3$)$_4$)(tBu-N)TiCl$_2$ through $^1$H-NMR.

$^1$H-NMR (500 MHz, CDCl$_3$): δ 3.3 (s, 4H), 2.2 (s, 6H), 2.1 (s, 6H), 1.8-0.8 (m), 1.4 (s, 9H), 1.2 (s, 9H), 0.7 (s, 3H).

Comparative Synthesis Example 5

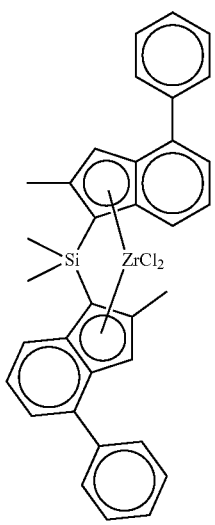

Synthesis of 7-phenyl-2-methyl-1H-indene

Bromobenzene (2.92 g, 18.6 mmol) was dissolved in anhydrous THF (20 mL) under argon (Ar). The temperature was lowered to −78° C., and an n-butyllithium solution (n-BuLi, 2.5 M in hexane, 8.2 mL) was added, followed by stirring at room temperature for 30 minutes. The temperature was lowered again to −78° C., trimethyl borate (6.2 mL, 55.6 mmol) was added and then stirred at room temperature overnight. A saturated NH$_4$Cl solution (sat. NH$_4$Cl) was added to the reaction solution and then extracted with MTBE. Anhydrous MgSO$_4$ was added and water was removed by filtration. The solution was concentrated under reduced pressure and the subsequent reaction was carried out without further purification.

The above obtained compound and 7-bromo-2-methyl-1H-indene (3.87 g, 18.6 mmol) and Na$_2$CO$_3$ (5.91 g, 55.8 mmol) were added to a mixed solvent of toluene (40 mL), H$_2$O (20 mL), and EtOH (20 mL) and stirred. Pd(PPh$_3$)$_4$ (1.07 g, 0.93 mmol) was added to the above solution and then stirred at 90° C. overnight. After the reaction was completed, MTBE and water were added and the organic layer was separated. Water was removed with anhydrous MgSO$_4$. The obtained solution was concentrated under reduced pressure and then purified by column chromatography (E/H=1/30) to obtain 7-phenyl-2-methyl-1H-indene (2.9 g, 53%).

Synthesis of bis(4-phenyl-2-methyl-1H-inden-1-yl)dimethylsilane 7-phenyl-2-methyl-1H-indene (2.02 g, 9.85 mmol) and CuCN (44 mg, 0.49 mmol) were dissolved in toluene (18 mL) and THF (2 ml) under argon (Ar). This solution was cooled to −30° C. and n-BuLi (2.5 M in hexane, 4.1 mL) was slowly added. After stirring at this temperature for about 20 minutes, the temperature was raised to room temperature and the stirring was carried out for 2.5 hours. Dichlorodimethylsilane (0.59 mL, 4.89 mmol) was added to this solution and then stirred at room temperature overnight. After the reaction was completed, MTBE and water were added and the organic layer was separated. The obtained organic layer was dried over anhydrous MgSO$_4$ to remove water, concentrated under reduced pressure and then purified by column chromatography (hexane) to obtain bis(4-phenyl-2-methyl-1H-inden-1-yl)-dimethylsilane as a white solid.

Synthesis of dimethylsilanyl-bis(4-phenyl-2-methyl-1H-inden-1-yl)zirconium Dichloride Bis(4-phenyl-2-methyl-1H-inden-1-yl)-dimethylsilane (2.0 g, 3.12 mmol) was added to a 50 mL Schlenk flask under argon (Ar) and dissolved by injecting diethyl ether (20 mL). The temperature was lowered to −78° C., and n-BuLi (2.5 M in hexane, 2.7 mL) was added and then stirred at room temperature for 2 hours. The solvent was distilled under vacuum/reduced pressure, ZrCl$_4$(THF)$_2$ (1.18 g, 3.12 mmol) mmol) was added therein in a glove box, and the temperature was lowered to −78° C. Diethyl ether (20 mL) was added to the mixture and then the temperature was raised to room temperature, followed by stirring overnight. The solvent was distilled under reduced pressure and dissolved in CH$_2$Cl$_2$ to remove the solid. The solution was concentrated under reduced pressure, and the obtained solid was washed with toluene and CH$_2$Cl$_2$ to obtain dimethylsilanyl-bis(4-phenyl-2-methyl-1H-inden-1-yl)zirconium dichloride (260 mg, 10%, r/m about 16/1) as a racemic-rich yellow solid.

<Preparation of Supported Catalyst>

Example 1: Preparation of Hybrid Supported Metallocene Catalyst

First, silica (SP 952 manufactured by Grace Davison) was dehydrated and dried under vacuum at a temperature of 250° C. for 12 hours to prepare a support.

Then, 3.0 kg of a toluene solution was added to a 20 L high-pressure stainless steel (sus) reactor, 1000 g of the previously prepared silica (Grace Davison, SP952) was added thereto, and the reactor temperature was raised to 40° C. while stirring. After the silica was sufficiently dispersed for 60 minutes, 8 kg of a 10 wt % methylaluminoxane (MAO)/toluene solution was added, and the mixture was slowly reacted while stirring at 200 rpm for 12 hour. Thereafter, the temperature of the reactor was raised to 60° C., followed by adding 0.1 mmol of the first metallocene compound prepared in Synthesis Example 1 dissolved in toluene in a solution state. Then, the reactant mixture was reacted for 2 hours while stirring at 200 rpm on 50° C.

After completion of the reaction, 0.05 mmol of the second metallocene compound prepared in Synthesis Example 3 was dissolved in toluene, and reacted for 2 hours while stirring at 200 rpm on 50° C.

When the reaction was completed, the stirring was stopped and the reaction solution was subjected to decantation after settling for 30 minutes. After washing with a sufficient amount of toluene, 50 mL of toluene was added again. Then, stirring was stopped for 10 minutes, and washing with a sufficient amount of toluene was performed to remove compounds not participating in the reaction. Thereafter, 3.0 kg of hexane was added to the reactor and stirred, and the hexane slurry was transferred to a filter for filtration.

A hybrid supported metallocene catalyst was obtained by primary drying at room temperature under reduced pressure for 5 hours, and secondary drying at 50° C. under reduced pressure for 4 hours.

Example 2: Preparation of Hybrid Supported Metallocene Catalyst

A hybrid supported metallocene catalyst was prepared in the same manner as in Example 1, except that 0.2 mmol of the metallocene compound prepared in Synthesis Example 1 and 0.05 mmol of the metallocene compound prepared in Synthesis Example 4 were added, respectively.

Example 3: Preparation of Hybrid Supported Metallocene Catalyst

A hybrid supported metallocene catalyst was prepared in the same manner as in Example 1, except that 0.08 mmol of the metallocene compound prepared in Synthesis Example 2 and 0.08 mmol of the metallocene compound prepared in Synthesis Example 3 were added, respectively.

Example 4: Preparation of Hybrid Supported Metallocene Catalyst

A hybrid supported metallocene catalyst was prepared in the same manner as in Example 1, except that 0.1 mmol of the metallocene compound prepared in Synthesis Example 1 and 0.05 mmol of the metallocene compound prepared in Synthesis Example 5 were added, respectively.

Comparative Example 1: Preparation of Hybrid Supported Metallocene Catalyst

A hybrid supported metallocene catalyst was prepared in the same manner as in Example 1, except that 0.1 mmol of the metallocene compound prepared in Comparative Synthesis Example 1 and 0.05 mmol of the metallocene compound prepared in Synthesis Example 3 were added, respectively.

Comparative Example 2: Preparation of Hybrid Supported Metallocene Catalyst

A hybrid supported metallocene catalyst was prepared in the same manner as in Example 1, except that 0.1 mmol of the metallocene compound prepared in Comparative Synthesis Example 2 and 0.05 mmol of the metallocene compound prepared in Synthesis Example 3 were added, respectively.

Comparative Example 3: Preparation of Hybrid Supported Metallocene Catalyst

A hybrid supported metallocene catalyst was prepared in the same manner as in Example 1, except that 0.1 mmol of the metallocene compound prepared in Comparative Synthesis Example 3 and 0.05 mmol of the metallocene compound prepared in Synthesis Example 3 were added, respectively.

Comparative Example 4: Preparation of Hybrid Supported Metallocene Catalyst

A hybrid supported metallocene catalyst was prepared in the same manner as in Example 1, except that 0.1 mmol of the metallocene compound prepared in Synthesis Example 2 and 0.05 mmol of the metallocene compound prepared in Comparative Synthesis Example 4 were added, respectively.

Comparative Example 5: Preparation of Hybrid Supported Metallocene Catalyst

A hybrid supported metallocene catalyst was prepared in the same manner as in Example 1, except for adding the metallocene compound (catalyst G) prepared in Comparative Synthesis Example 5 as a second precursor, namely, a second metallocene compound, instead of the metallocene compound prepared in Synthesis Example 3.

TEST EXAMPLES

Test Example 1: Preparation of Polyethylene

Ethylene-1-hexene was slurry-polymerized in the presence of the supported catalyst prepared in one of Examples and Comparative Examples under the conditions shown in Table 1 below.

At this time, a continuous polymerization reactor for an iso-butane (i-C4) slurry loop process was used, a reactor volume was 140 L, and a reaction flow rate was about 7 m/s. Gases (ethylene, hydrogen) required for polymerization and 1-hexene as a comonomer were constantly and continuously added, and the flow rates were adjusted according to the target product. The concentrations of all gases and comonomer (1-hexene) were confirmed by on-line gas chromatograph. The supported catalyst was introduced into the isobutane slurry, the reactor pressure was maintained at about 40 bar, and the polymerization temperature was about 85° C.

TABLE 1

| | First precursor | Second precursor | Molar ratio of catalyst precursors | Ethylene (C2, kg/h) | iso-Butane (i-C4, kg/h) | 1-Hexane (C6, 중량%) | $H_2$ (ppm)** | C6/C2*** |
|---|---|---|---|---|---|---|---|---|
| Example 1 | Synthesis Example 1 | Synthesis Example 3 | 2:1 | 25.2 | 28 | 15 | 34 | 0.3 |
| Example 2 | Synthesis Example 1 | Synthesis Example 3 | 4:1 | 25.1 | 32 | 15 | 34 | 0.28 |
| Example 3 | Synthesis Example 2 | Synthesis Example 4 | 1:1 | 25 | 32 | 15 | 33 | 0.31 |
| Example 4 | Synthesis Example 1 | Synthesis Example 5 | 2:1 | 25 | 32 | 15 | 33 | 0.31 |
| Comparative Example 1 | Comparative Synthsise Example 1 | Synthesis Example 3 | 2:1 | 25.1 | 30 | 12 | 27 | 0.51 |
| Comparative Example 2 | Comparative Synthesis Example 2 | Synthesis Example 3 | 2:1 | 25 | 30 | 12 | 33 | 0.35 |
| Comparative Example 3 | Comparative Synthesis Example 3 | Synthesis Example 3 | 2:1 | 25 | 30 | 15 | 34 | 0.4 |
| Comparative Example 4 | Synthesis Example 2 | Comparative Synthesis Example 4 | 2:1 | 25 | 30 | 15 | 30 | 0.35 |
| Comparative Example 5 | Synthesis Example 1 | Comparative Synthesis Example 5 | 2:1 | 25 | 30 | 15 | 30 | 0.4 |

* Molar ratio of catalyst precursors is a molar ratio of the first metallocene cornpound:the second metallocene compound.
** The amount of adding Hydrogen is ppm value based on ethylene content.
*** C6/C2 is a molar ratio of 1-hexene to ethylene in the slurry reactor.

Test Example 2: Evaluation of Activity of Hybrid Supported Catalyst, Process Stability and Physical Properties of Polyethylene The activity, process stability, and physical properties of the polyethylene copolymer of Examples and Comparative Examples were measured by the following method, and the results are shown in Table 2 below.

(1) Activity (kg PE/g·cat·hr)

It was calculated as a ratio of the weight (kg PE) of the polyethylene copolymer prepared to the weight of the supported catalyst used (g-Cat) per unit time (h).

(2) Melt Index (g/10 min, MI)

The melt index ($MI_{2.16}$) was measured according to ASTM D1238 at 190° C. under a load of 2.16 kg, and expressed as the weight (g) of the polymer melted for 10 minutes.

(3) Density

The density was measured according to ASTM D 792 (g/cm³).

(4) Bulk Density (BD)

The bulk density was measured according to ASTM D 1895.

(5) Process Stability Depending on Whether or not Fouling Occurs

In the process for preparing polyethylene copolymer, it is checked whether a fouling occurs, namely, whether solid products and so on are entangled on the inner device and wall surfaces of the reactor. Thereafter, when fouling does not occur, the process stability is estimated as 'Good.' On the other hand, when fouling occurs, process stability was estimated as 'Bad.' The results are shown in Table 2 below.

(6) Dart Drop Impact Strength

A polyethylene copolymer film (BUR 2.3, film thickness 48 to 52 μm) was prepared using a film applicator, and then, the dart drop impact strength of each film sample was measured 20 or more times according to ASTM D1709 [Method A], and the average value was taken.

TABLE 2

| | Activity (kg PE/ g · cat · hr) | MI2.16 (g/10 min) | Density (g/cm³) | BD (g/mL) | Process stability | Dart drop impact strength (g) |
|---|---|---|---|---|---|---|
| Example 1 | 5.8 | 1.06 | 0.9159 | 0.42 | Good | 1820 |
| Example 2 | 5.1 | 1.10 | 0.9168 | 0.44 | Good | 1700 |
| Example 3 | 5.2 | 1.01 | 0.9164 | 0.41 | Good | 1780 |
| Example 4 | 5.6 | 0.98 | 0.9161 | 0.42 | Good | 1750 |
| Comparative Example 1 | 4.5 | 0.98 | 0.9169 | 0.37 | Good | 900 |
| Comparative Example 2 | 4.5 | 1.0 | 0.9170 | 0.38 | Good | 700 |
| Comparative Example 3 | 5.5 | 1.0 | 0.9170 | 0.40 | Bad | 850 |
| Comparative Example 4 | 4.0 | 0.95 | 0.9168 | 0.38 | Good | 1100 |
| Comparative Example 5 | 3.5 | 1.05 | 0.9165 | 0.37 | Bad | 800 |

As shown in Table 2, it can be seen that Examples of the present disclosure secured an excellent process stability and high polymerization activity in the ethylene polymerization reaction, simultaneously with high comonomer incorporation properties, due to using the specific hybrid supported catalysts of Examples 1 to 4, compared to the hybrid supported catalysts of Comparative Examples 1 to 5. In addition, it can be seen that Examples of the present disclosure could provide a low density polyethylene copolymer for preparing a film having excellent processability as well as high mechanical properties with dart drop impact resistance.

The invention claimed is:

1. A hybrid supported metallocene catalyst, comprising
at least one first metallocene compound selected from compounds represented by Chemical Formula 1;
at least one second metallocene compound selected from compounds represented by Chemical Formula 2; and
a support on which the first and the second metallocene compounds are supported:

$$(Cp^1R^a)_m(Cp^2R^b)M^1Q^1_{3-n}$$ [Chemical Formula 1]

in Chemical Formula 1,
$M^1$ is a Group 4 transition metal;
$Cp^1$ and $Cp^2$ are each independently selected from the group consisting of cyclopentadienyl, indenyl, 4,5,6,7-tetrahydro-1-indenyl, and fluorenyl, each of which is unsubstituted or substituted with $C_{1-20}$ hydrocarbonyl;
$R^a$ and $R^b$ are each independently hydrogen, $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl, provided that at least one of $R^a$ or $R^b$ is not hydrogen;
each of $Q^1$ is independently halogen, $C_{1-20}$ alkyl, $C_{2-20}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino group, $C_{2-20}$ alkoxyalkyl, $C_{2-20}$ alkylalkoxy, or $C_{7-40}$ arylalkoxy; and
n is 1 or 0;

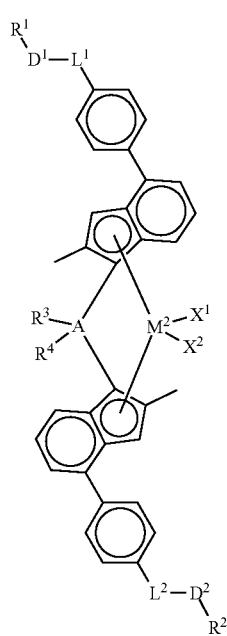

[Chemical Formula 2]

in Chemical Formula 2,
$M^2$ is a Group 4 transition metal;
A is carbon (C), silicon (Si), or germanium (Ge);
$X^1$ and $X^2$ are the same as or different from each other, and are each independently halogen, or $C_{1-20}$ alkyl;
$L^1$ and $L^2$ are the same as or different from each other, and are each independently $C_{1-20}$ alkylidene;
$D^1$ and $D^2$ are oxygen;
$R^1$ and $R^2$ are each independently $C_{1-20}$ alkyl, $C_{2-20}$ alkenyl, $C_{6-20}$ aryl, $C_{7-40}$ alkylaryl, or $C_{7-40}$ arylalkyl; and
$R^3$ and $R^4$ are each independently $C_{1-20}$ alkyl.

2. The hybrid supported metallocene catalyst of claim 1, wherein
$M^1$ is zirconium (Zr) or hafnium (Hf),
$Cp^1$ and $Cp^2$ are each independently cyclopentadienyl, indenyl, or fluorenyl;
$R^a$ and $R^b$ are each independently hydrogen, $C_{1-6}$ linear or branched alkyl, $C_{2-6}$ alkynyl, $C_{1-6}$ alkyl substituted with $C_{1-6}$ alkoxy, $C_{1-6}$ alkyl substituted with $C_{6-12}$ aryl, or $C_{6-12}$ aryl, provided that at least one of $R^a$ or $R^b$ is not hydrogen; and
each of $Q^1$ is independently halogen.

3. The hybrid supported metallocene catalyst of claim 1, wherein the first metallocene compound is represented by one of the following structural formulae:

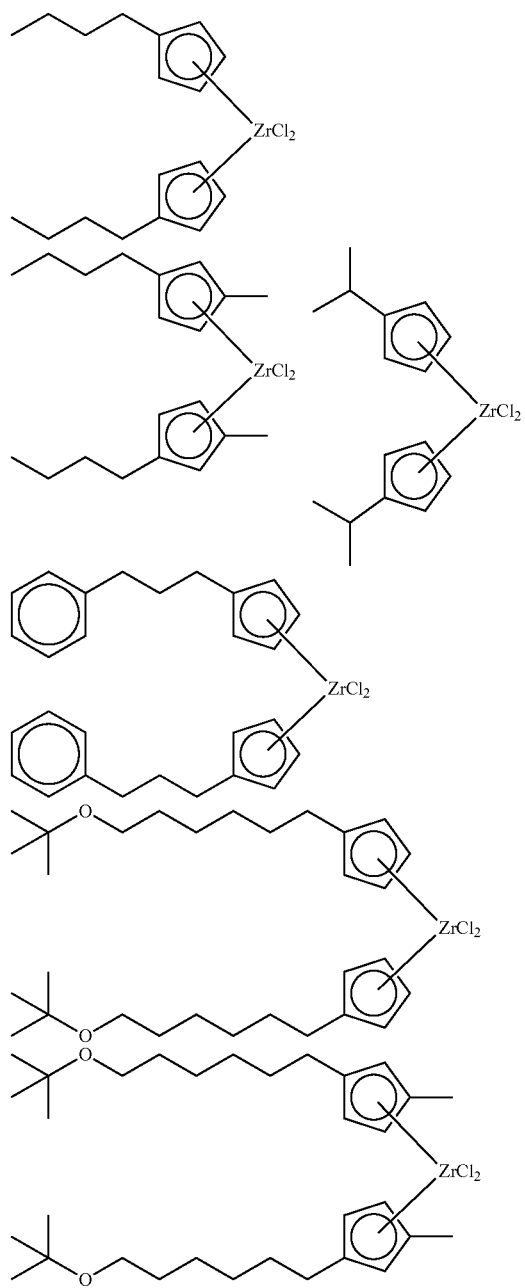

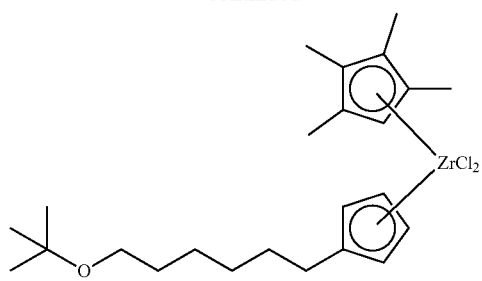
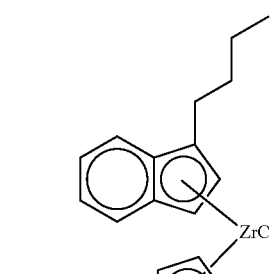
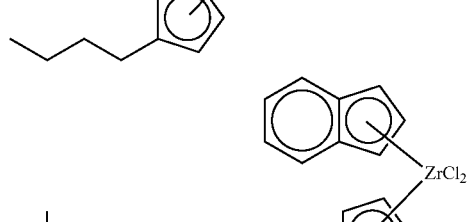
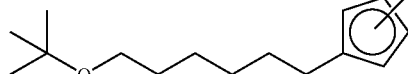
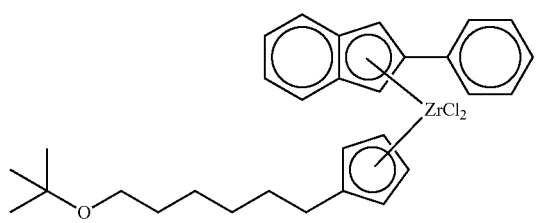
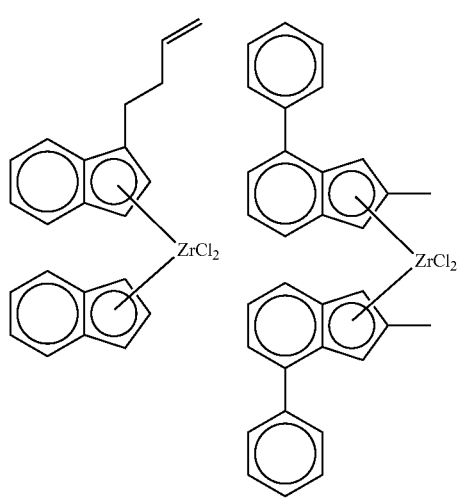

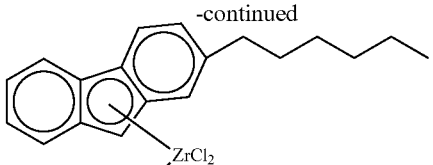
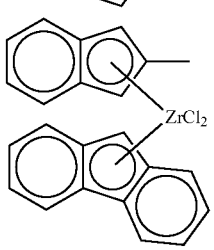
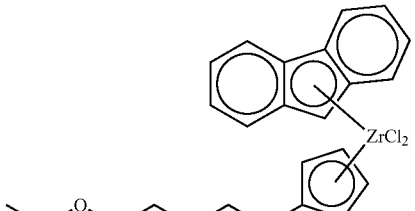
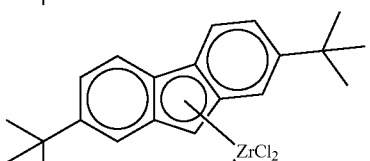
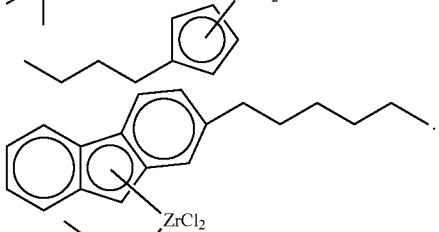
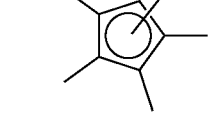

4. The hybrid supported metallocene catalyst of claim 1, wherein $M^2$ is zirconium (Zr) or hafnium (Hf), A is silicon (Si), and each of $X^1$ and $X^2$ is independently halogen.

5. The hybrid supported metallocene catalyst of claim 1, wherein each of $L^1$ and $L^2$ is independently $C_{1-3}$ alkylidene;

$R^1$ and $R^2$ are each independently $C_{1-6}$ linear or branched alkyl, or $C_{6-12}$ aryl.

6. The hybrid supported metallocene catalyst of claim 1, wherein each of $R^3$ and $R^4$ is independently $C_{1-6}$ alkyl.

7. The hybrid supported metallocene catalyst of claim 1, wherein the second metallocene compound is represented by one of the following structural formulae:

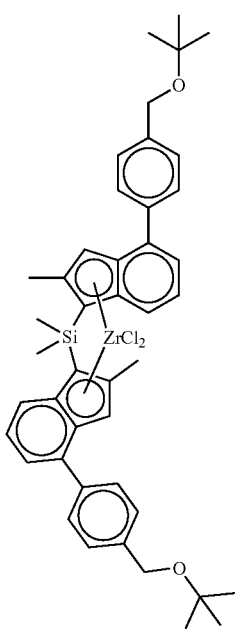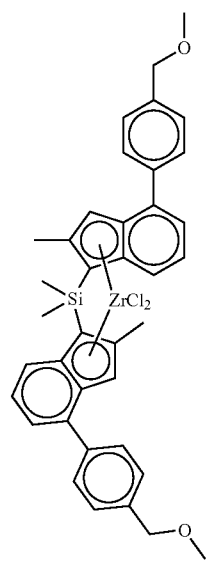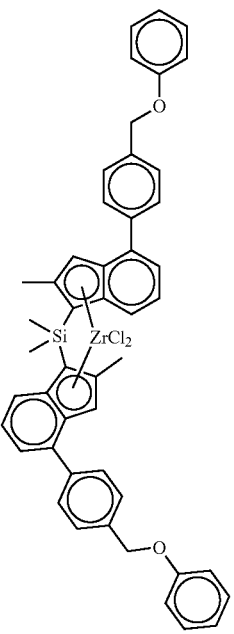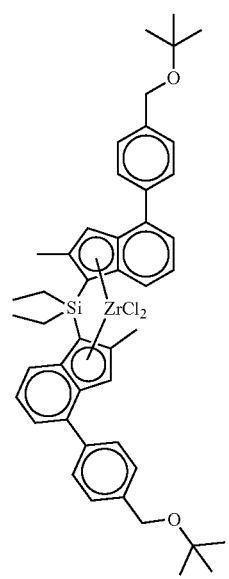
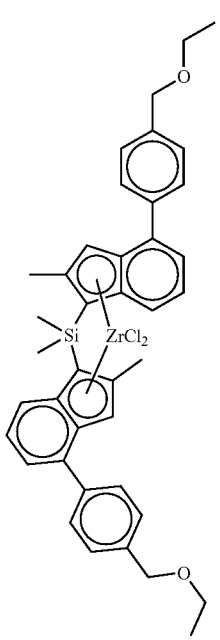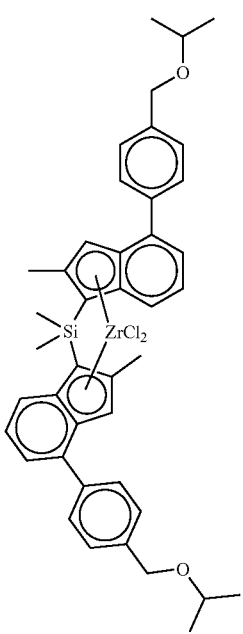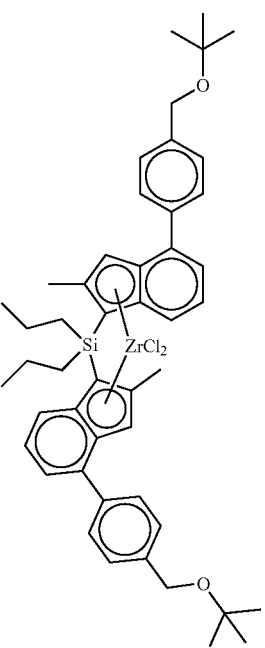

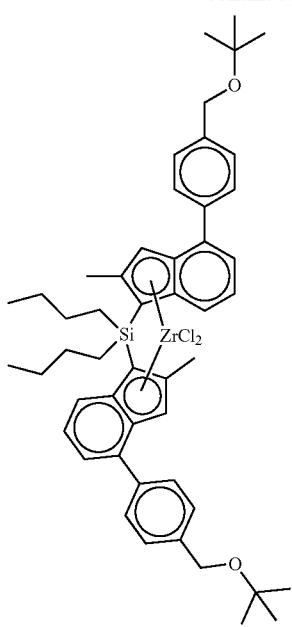

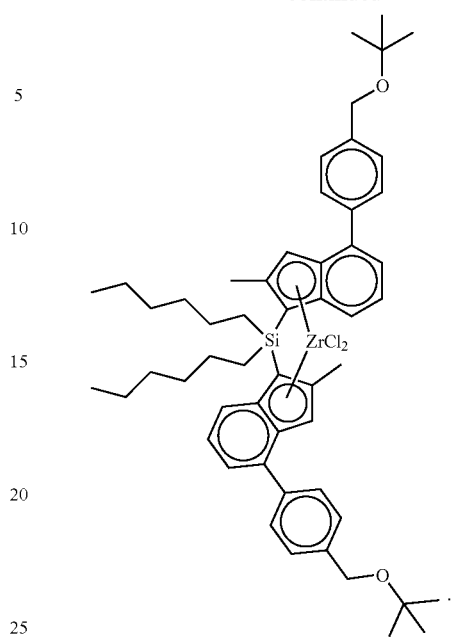

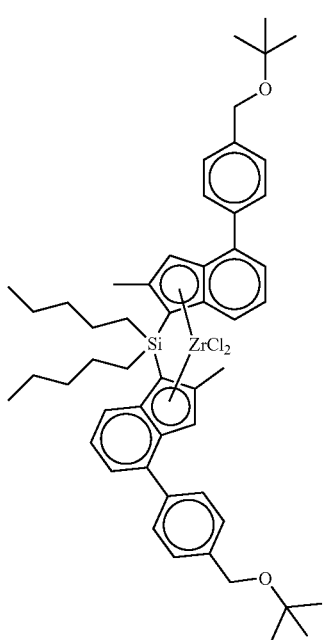

8. The hybrid supported metallocene catalyst of claim 1, wherein the first metallocene compound and the second metallocene compound are supported in a molar ratio of 0.3:1 to 4:1.

9. The hybrid supported metallocene catalyst of claim 1, wherein the support contains a hydroxyl group and a siloxane group on its surface.

10. The hybrid supported metallocene catalyst of claim 1, wherein the support is at least one selected from the group consisting of silica, silica-alumina, and silica-magnesia.

11. A process for preparing a polyethylene copolymer, comprising the step of copolymerizing ethylene and alpha-olefin in the presence of the hybrid supported metallocene catalyst of claim 1.

12. The process for preparing a polyethylene copolymer of claim 11, wherein the step of copolymerization is carried out by reacting the alpha-olefin in an amount of 0.45 mole or less based on 1 mole of the ethylene.

13. The process for preparing a polyethylene copolymer of claim 11, wherein the alpha-olefin is at least one selected from the group consisting of 1-butene, 1-pentene, 1-hexene, 4-methyl-1-pentene, 1-octene, 1-decene, 1-dodecene, 1-tetradecene, 1-hexadecene, 1-octadecene, and 1-eicosene.

14. The hybrid supported metallocene catalyst of claim 1, wherein the first metallocene compound is represented by any one of Chemical Formulas 1-1 to 1-5:

[Chemical Formula 1-1]

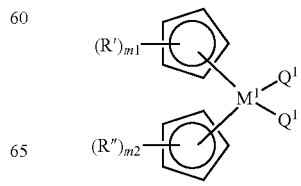

[Chemical Formula 1-2]

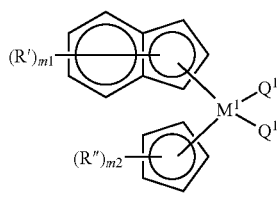

[Chemical Formula 1-3]

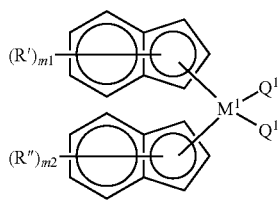

[Chemical Formula 1-4]

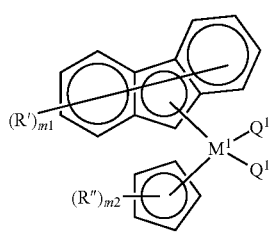

[Chemical Formula 1-5]

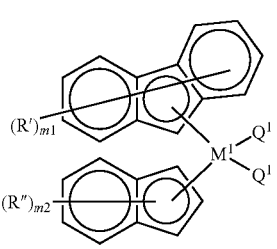

in Chemical Formulae 1-1 to 1-5, $M^1$ and $Q^1$ are the same as defined in Chemical Formula 1, R' and R" are each independently $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

m1 is each independently an integer of 0 to 8; and m2 is each independently an integer of 0 to 6, and at least one of m1 or m2 is not 0.

\* \* \* \* \*